United States Patent [19]

Mizuno

[11] Patent Number: 5,682,073
[45] Date of Patent: Oct. 28, 1997

[54] HYBRID EXCITATION TYPE PERMANENT MAGNET SYNCHRONOUS MOTOR

[75] Inventor: Takayuki Mizuno, Tokyo, Japan

[73] Assignee: Kabushiki Kaisha Meidensha, Tokyo, Japan

[21] Appl. No.: 447,903

[22] Filed: May 23, 1995

Related U.S. Application Data

[62] Division of Ser. No. 227,395, Apr. 14, 1994, abandoned.

[30] Foreign Application Priority Data

Apr. 14, 1993 [JP] Japan ........................ 5-87241
Sep. 29, 1993 [JP] Japan ........................ 5-242475

[51] Int. Cl.⁶ ........................ H02K 19/12; H02K 19/10
[52] U.S. Cl. ........................ 310/165; 310/156; 310/269
[58] Field of Search ........................ 310/112, 114, 310/156, 162, 163, 164, 165, 269

[56] References Cited

U.S. PATENT DOCUMENTS

| | | | |
|---|---|---|---|
| 3,743,873 | 7/1973 | de Jong | 310/165 |
| 3,845,369 | 10/1974 | Heyne, III | 310/680 X |
| 4,496,868 | 1/1985 | Advolotkin | 310/165 |
| 4,661,736 | 4/1987 | Kawada | 310/156 |
| 4,782,257 | 11/1988 | Secher et al. | 310/114 |
| 4,814,654 | 3/1989 | Gerfast | 310/154 |
| 5,304,882 | 4/1994 | Lipo | 310/156 |
| 5,317,227 | 5/1994 | Palma | 310/156 |
| 5,345,131 | 9/1994 | Torok | 310/181 |
| 5,436,518 | 7/1995 | Kawai | 310/156 |

FOREIGN PATENT DOCUMENTS 0 228 873  7/1987  European Pat. Off.

OTHER PUBLICATIONS

Nasar, S.A. and Unnewehr, L. E. Electromechanics and Electric Machines 1983 (month unknown) p. 276.

*Primary Examiner*—Steven L. Stephan
*Assistant Examiner*—Judson H. Jones
*Attorney, Agent, or Firm*—Foley & Lardner

[57] ABSTRACT

A hybrid excitation type permanent magnet synchronous motor is provided with an armature and a rotor core arranged to be rotated relative to the armature. Permanent magnets are installed on the rotor core and generate magnetic flux which passes through the armature through a gap between the rotor and armature. Salient pole portions are integral with the rotor core and are not covered with the permanent magnets. The salient pole portions are arranged opposite to the armature through a gap such that the magnetic flux generated by the permanent magnets is effected by the magnetic flux passing through the salient pole portions. A direct current excitation coil generates the magnetic flux passing through the salient pole portions. Therefore, an operable speed area of the motor is increased without using demagnetization control and without degrading the efficiency.

7 Claims, 26 Drawing Sheets

DEMAGNETIZATION ($I_{DC} > 0$)    MAGNETIC FLUX

STATIONARY ($I_{DC} = 0$)

MAGNETIZATION ($I_{DC} < 0$)

FIG.26
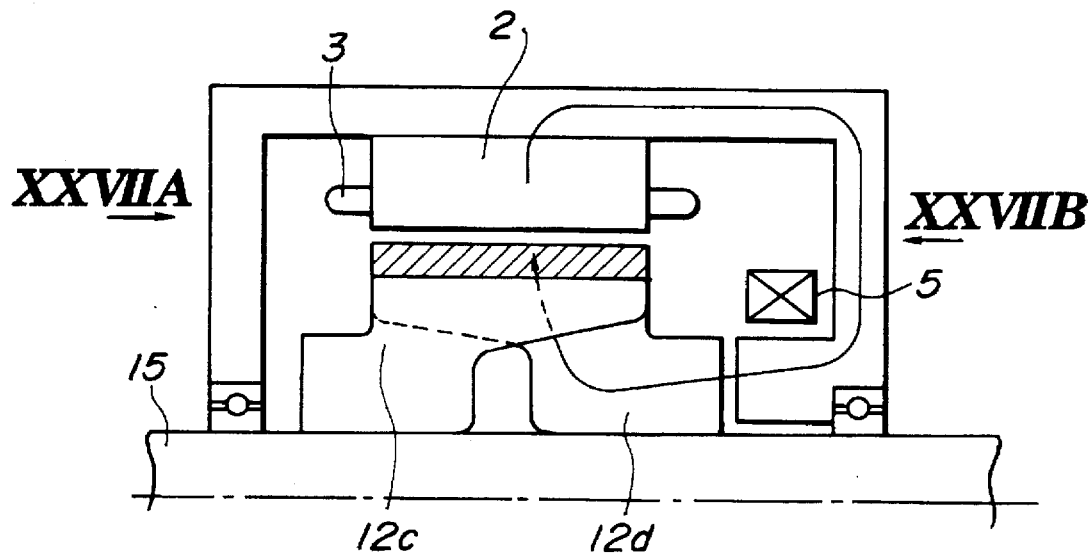
FIG.27A
FIG.27B
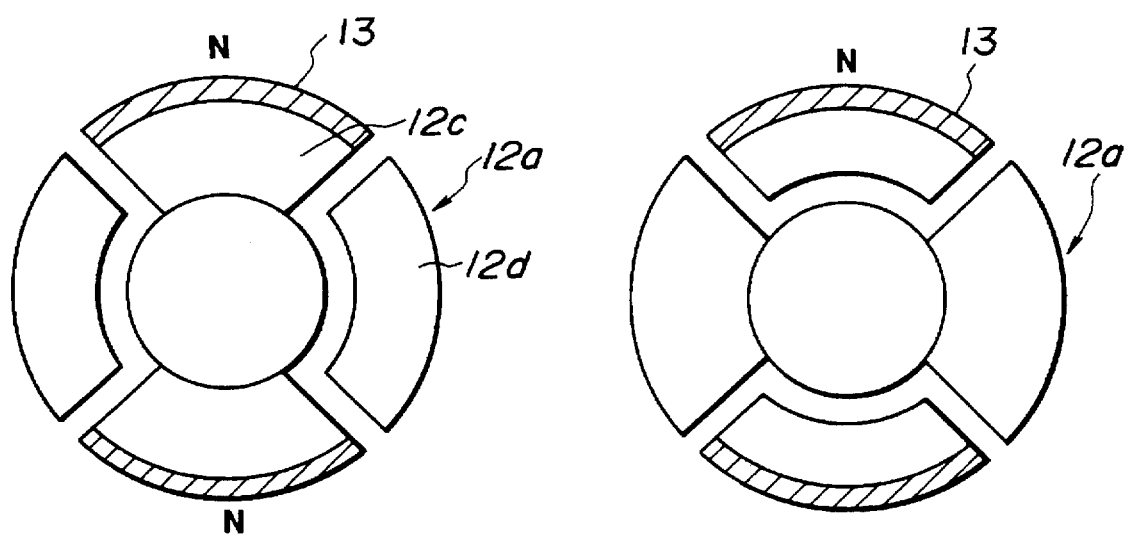

FIG.30A    FIG.30B

HYBRID EXCITATION TYPE PERMANENT MAGNET SYNCHRONOUS MOTOR

This application is a division of application Ser. No. 08/227,395, filed Apr. 14, 1994 now abandoned.

BACKGROUND OF THE INVENTION

1. Field of the Invention

The present invention relates to improvements in a permanent magnet motor, and more particularly to a hybrid excitation type permanent magnet motor.

2. Description of the Prior Art

Various types of permanent magnet (PM) motors have been proposed and are in practical use. For example, in a typical PM motor provided with a three-phase coil as an armature at a stator side, a rotor is formed by attaching permanent magnets 200 on a field core 100 as shown in FIG. 34A, or is formed by embedding the permanent magnets 200 into the field core 100 as shown in FIG. 34B. With these types of motors, the magnetic flux by the permanent magnet 200 is determined by properties of the permanent magnet 200 and a magnetic circuit, and is kept constant without being effected by a rotation speed of the motor. Accordingly, an induced voltage by an armature coil is increased in proportion with the rotation speed. When a terminal voltage, which is the sum of the induced voltage and a first impedance drop, corresponds with the maximum value of the electric source voltage, the rotation speed at this time becomes a maximum rotation speed. In case such a motor implements a power-constant operation by keeping the power source voltage constant, as a method for broadening operable speed area of the motor by raising the maximum rotation speed, a so-called demagnetization control has been proposed, in which an electric current is applied to an armature coil for canceling the magnetic flux of the permanent magnet 200, in order to equivalently reduce induced voltage. FIG. 35 shows a characteristic curve obtained from such a demagnetization control.

Although it is commonly known that the permanent magnet motor is operated at a high efficiency since no excitation input is required, the permanent magnet motor employing the demagnetization control has a problem in that the efficiency is lowered if the constant-output area is broadened, as shown in FIG. 35. Further, the electric current for the demagnetization is required even under no-load condition.

SUMMARY OF THE INVENTION

It is an object of the present invention to provide an improved hybrid excitation type permanent magnet synchronous motor by which an operable speed area is increased without using the demagnetization control and lowering the efficiency.

Another object of the present invention is to provide an improved permanent magnet synchronous motor which performs to lower iron loss.

A hybrid excitation type permanent magnet synchronous motor according to the present invention comprises an armature and a rotor core which is disposed to be rotated relative to the armature. A plurality of permanent magnets are installed on the rotor core. The permanent magnets generate magnetic flux which passes through the armature through a gap between the rotor core and the armature. Salient pole portions are integral with the rotor core and are not covered with the permanent magnets. The salient pole portions are arranged opposite to the armature through a gap such that the magnetic flux generated by the permanent magnets is effected by magnetic flux passing through the salient pole portions. A direct current excitation coil generates magnetic flux passing through the salient pole portions.

With this arrangement, the control of the field system becomes facilitated as compared with a conventional demagnetization control. Further, the increase of the output torque in the constant-torque area and the reduction of the induced voltage in the constant-output area is easily realized and therefore the operable area is increased. Also, the direct current excitation input is largely reduced as compared with the conventional demagnetization control. Accordingly, the magnetic flux at a high speed is reduced, and the iron loss is largely reduced. This enables down-sizing of the motor and lowering of the production cost.

BRIEF DESCRIPTION OF THE DRAWINGS

In the drawings, like reference numerals designate like parts and elements throughout all figures, in which:

FIG. 26 is a cross-sectional view of a modification of the motor into a tandem type;

FIGS. 27A and 27B are side views of FIG. 26;

FIGS. 30A, 30B are side views of FIG. 29.

DETAILED DESCRIPTION OF THE INVENTION

Referring to FIGS. 1 to 5C, there is shown a first embodiment of a permanent magnet synchronizing motor of a hybrid excitation type according to the present invention.

Figure 1:
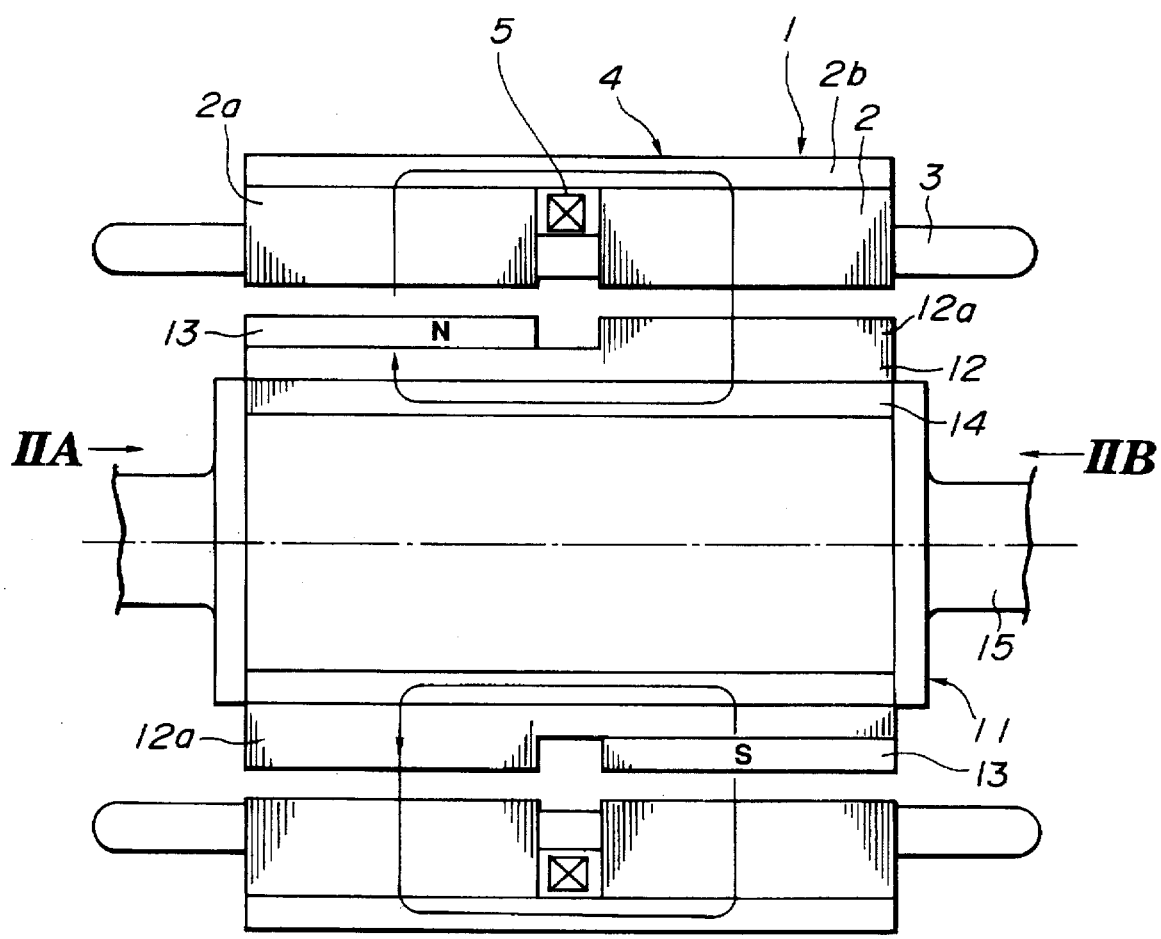
FIG. 1 is a cross-sectional view of a first embodiment of a motor according to the present invention.
Figures 4A, 4B:
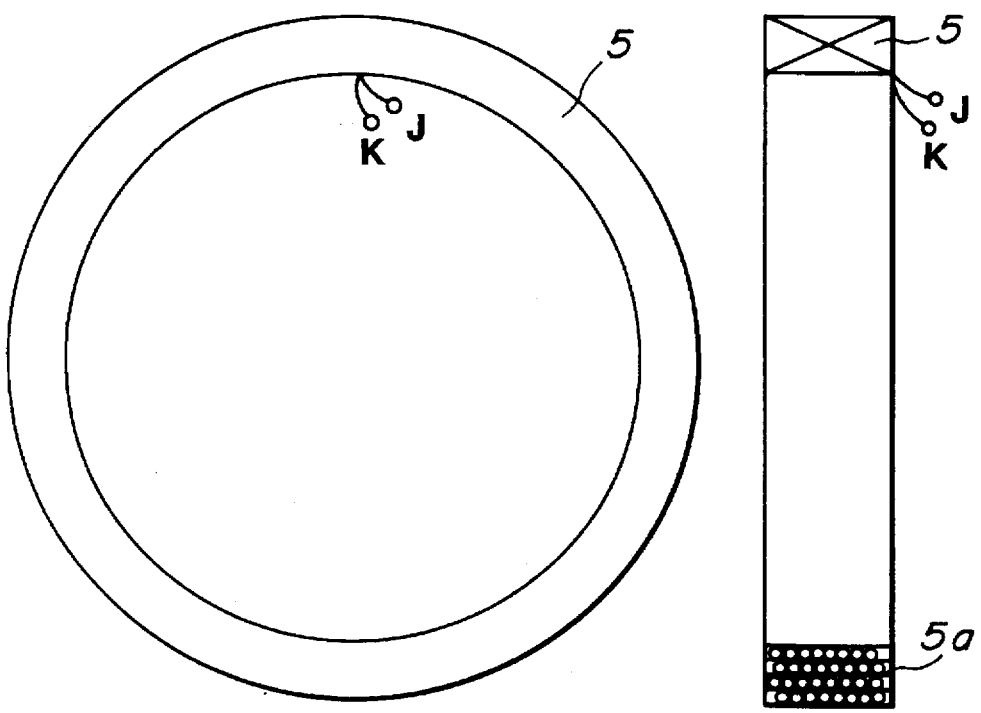
FIGS. 4A and 4B are a plan view and a side cross-sectional view of a D.C. excitation coil of FIG. 1.
Figure 5:
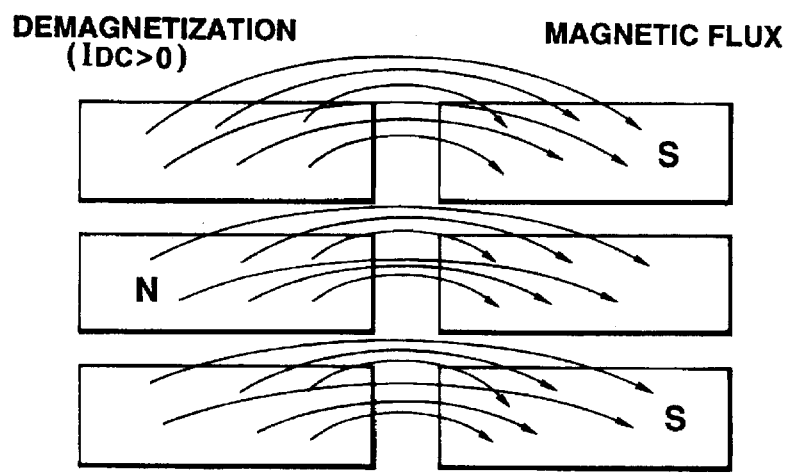
FIGS. 5A, 5B and 5C are explanatory views which show magnetic flux lines under various conditions.
Figure 5:
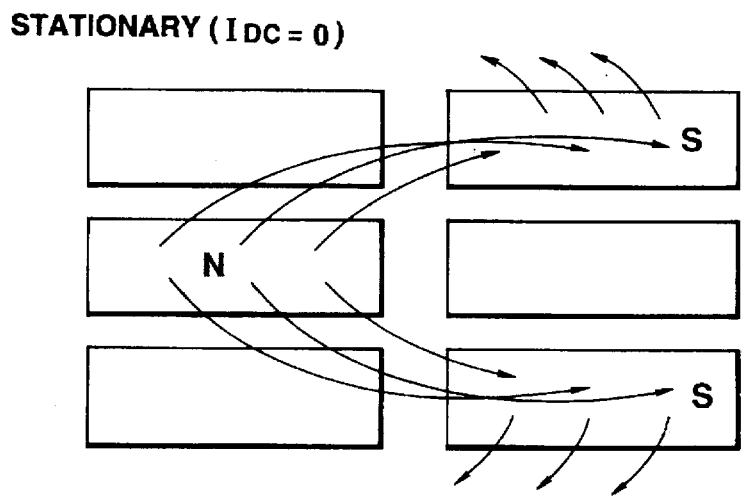
Figure 5:
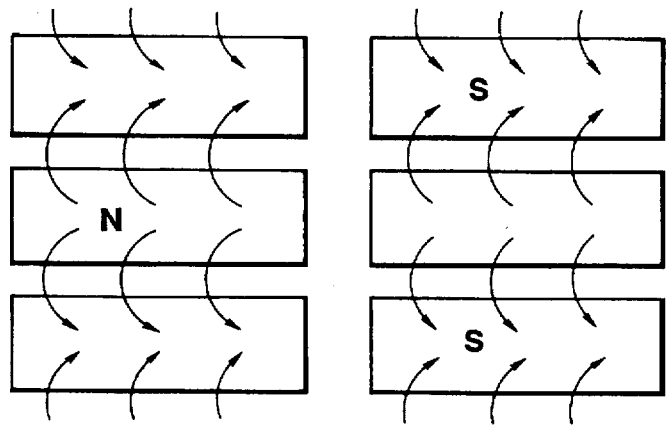

As shown in FIG. 1, an armature 1 of a stator is constituted by an armature core 2, an armature coil 3 and a cylindrical yoke 4. The armature core 2 is divided into two parts in the axial direction of the motor. One side of the armature core 2 is a N-pole core 2a, and the other side of the armature core 2 is a S-pole core 2b. A ring-shaped D.C. (direct current) excitation coil 5 as shown in FIGS. 4A and 4B is disposed between the N-pole core 2a and the S-pole core 2b. The N-pole and S-pole cores 2a and 2b are magnetically connected with each other through the yoke 4 and are mechanically supported by the yoke 4. The armature coil 3 is disposed so as to cross the N-pole and S-pole cores 2a and 2b. The excitation coil 5 is formed by winding a wire 5a and treating it by the insulation process. The number of turns of the excitation coil 5 is adjusted so as to generate a necessary magnetmotive force upon matching with a capacity of the electric source and the machinery dimension.

A rotor 11 is constituted by a rotor core 12 and a plurality of permanent magnets (PM) 13. The rotor core 12 is fixedly supported to a yoke 14 connected to a shaft 15. The rotor core 12 has salient pole portions 12a which project from the rotor core 12 and function as a salient pole, and the salient pole portions 12 are disposed at portions where the permanent magnets 13 are not located. The salient pole portions 12a are divided into N-pole salient pole portions 12aN and S-pole salient pole portions 12aS which are dividedly disposed so as to be opposite to the N-pole and S-pole cores 2a and 2b, respectively. The permanent magnets 13 are fixedly attached on the rotor core 12, and the rotor core 12 is inserted into the yoke to be supported thereby.

Figure 2A:
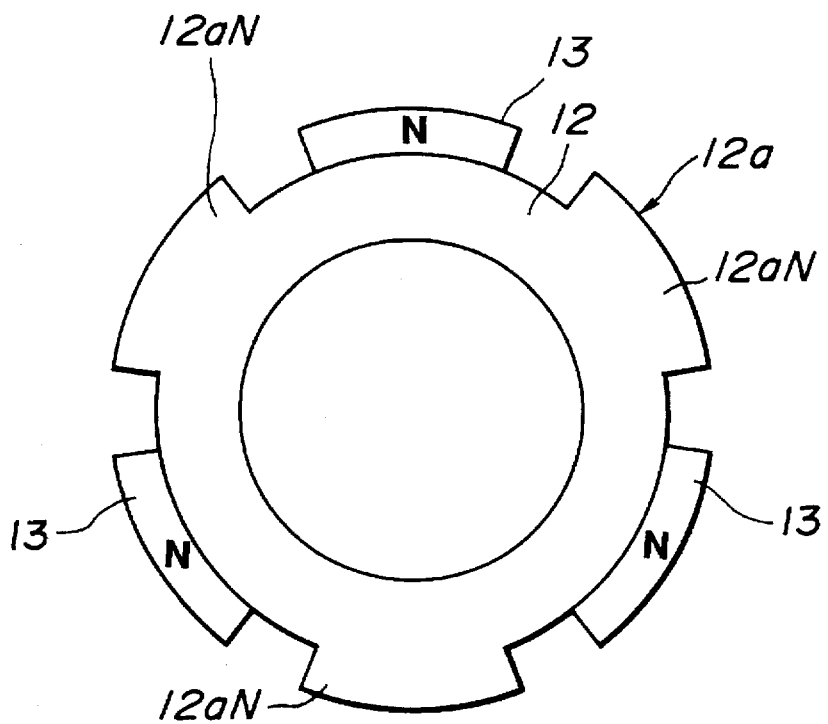
FIG. 2A is a side view of FIG. 1 as viewed from the arrow IIA.
Figure 2B:
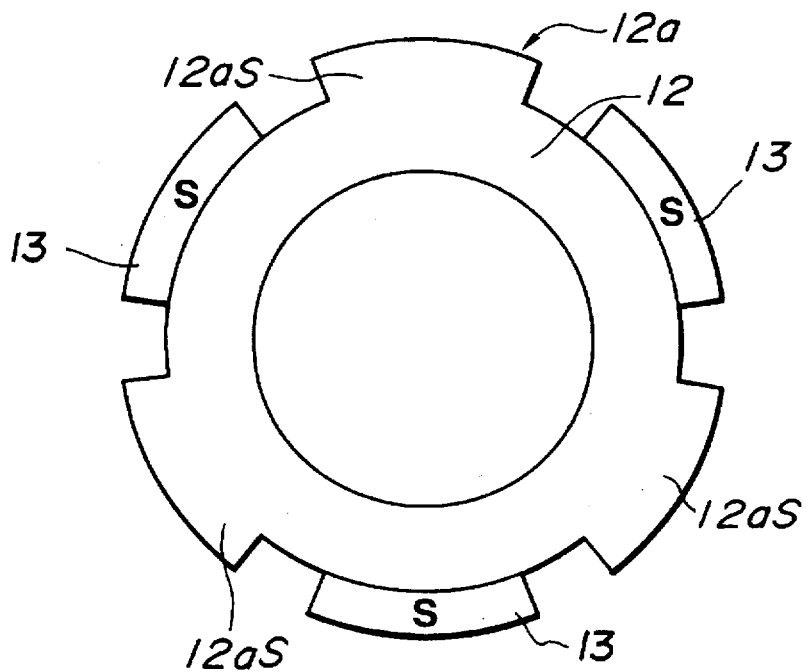
FIG. 2B is a side view of FIG. 1 as viewed from the arrow II.
Figure 3:
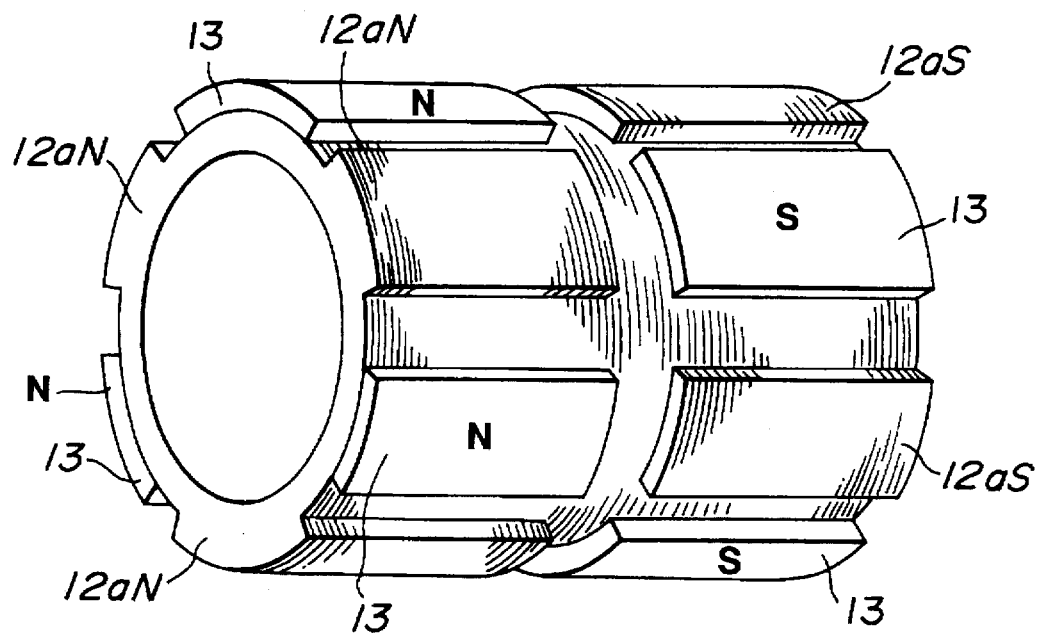
FIG. 3 is a perspective view of a rotor of FIG. 1.

The N-pole and S-pole salient pole portions 12aN and 12aS are formed such that the length thereof corresponds to those of the N-pole core 2a and the S-pole core 2b, respectively, and such that the widths thereof are constant along the circumferential direction. Further, the N-pole salient pole portions 12aN are arranged side by side with the N-pole side of the permanent magnets 13, as shown in FIG. 2A. The S-pole salient pole portions 12aS are arranged side by side with the S-pole sides of the permanent magnets 13, as shown in FIG. 2B. Furthermore, the N-pole salient pole portion 12aN and the S-pole side of the permanent magnets 13 are aligned along the axial direction of the motor at predetermined intervals. Similarly, the S-pole salient pole portion 12aS and the N-pole side of the permanent magnets 13 are aligned along the axial direction of the motor at predetermined intervals. That is, the rotor 11 is formed as shown in FIG. 3, in which the N-pole salient pole portions 12aN and the N-pole side of the permanent magnets 13 are alternately arranged in the circumferential direction. The S-pole salient pole portions 12aS and the S-pole side of the permanent magnets 13 are alternately arranged in the circumferential direction. Furthermore, the arrangement units of the N-pole side and the S-pole side are separated from each other by a width of the excitation coil 5, and the salient pole portions 12a and the permanent magnets 13 are aligned in the axial direction. The number of the salient pole portions 12a is the same as that of the permanent magnets 13. Although the embodiment in FIGS. 2A, 2B and 3 has been shown and described such that a permanent magnet 13 is disposed at six poles, it will be understood that the number of the poles is not limited to six. Furthermore, while the embodiment of FIGS. 2A, 2B and 3 has been shown and described such that the surface of the salient pole portion 12a and that of the permanent magnet 13 are located within a same circumferential surface, the salient pole portions 12a may be formed to further project toward the armature 1 so as to reduce the gap between the salient pole portions 12 and the armature 1. This arrangement will cause an effect that the magnetic flux passing through the salient pole portions 12 is increased. Because of the same reason, the width of the salient pole portions 12a may be broadened.

With this arrangement, when D.C. current is applied to the D.C. excitation coil 5, as indicated by the arrow of FIG. 1, the magnetic flux flows as follows: The yoke of the armature 1→the S-pole core 2b→gap→S-pole salient pole portion 12aS→the rotor core 12→the rotor yoke 14→the rotor core 12→the N-pole salient pole portion 12aN→gap→the N-pole core 2a→the yoke 4. The direction of the magnetic flux is changed by changing the direction of D.C. electric current, the size thereof is controlled by controlling the amount of the D.C. electric current.

Taking into consideration the D.C. magnetic flux by the excitation coil, the controlled condition of the magnetic flux is changed as follows:

Stationary

In the case of D.C. excitation current=0, no magnetic flux is generated. Only magnetic flux due to the permanent magnets 13 exists. That is, the magnetic flux from the N-pole of a permanent magnet 13 forms a circuit as follows:

gap→the N-pole side core 2a→the armature 1→the yoke 4→the S-pole side core 2b→gap→the S-pole of the permanent magnet 13→the rotor core 12→the rotor yoke 14→the rotor core 12→the N-pole of the permanent magnet 13. The magnetic flux in the gap is determined by the residual magnetic flux density (property of magnet) and surface area of the permanent magnet 13.

In this condition, the magnetic flux on the surface of the rotor 11 is represented such that the magnetic flux lines are directed from the N-pole side of the permanent magnet 13 through the armature yoke 4 to the S-pole of the permanent magnet 13 and from the S-pole of the permanent magnet 13 through the rotor yoke 14 to the N-pole of the permanent magnet 13, as shown in FIG. 5B.

Accordingly, each coil constituting the armature coil 3 cuts the magnetic flux of one N-pole and S-pole when the rotor 11 is rotated. As a result, A. C. voltage whose frequency is determined from the rotation speed and the number of poles is generated in the armature coil 3.

Demagnetization

When $I_{DC}=1$, a maximum rotation speed determined from the induction voltage generated from the permanent magnets 13 and the voltage of the electric source is obtained.

In the case that the magnetic flux due to the D.C. excitation flux has the same direction as that of the magnetic flux of the permanent magnets 13, $I_{DC}>0$, as is the same as in the $I_{DC}=0$ case, the magnetic flux due to the permanent magnet 13 is formed between the N-pole side and the S-pole side of the permanent magnets 13. On the other hand, the magnetic flux due to the D. C. excitation coil forms a closed loop as follows: the S-pole side of the core 2b→gap→the S-pole side salient pole portion 12aS→the rotor core 12→the rotor yoke 14→the rotor core 12→the N-pole side salient pole portion 12aN→gap→N-pole side core 2a→the armature yoke 4. In this condition, the magnetic permeability by the permanent magnet 13 is generally similar to that in the air, and the magnetic resistance (reluctance) of the magnet is larger than the magnetic permeability of the permanent magnet 13. Accordingly the D.C. magnetic flux passes through the salient pole portion 12a. As a result, the synthetic The magnetic flux in the surface of the rotor 11 is represented such that the magnetic flux lines are directed from the N-pole salient pole portion 12a to the S-pole side of the permanent magnet 13 aligned axially with the N-pole salient pole portion 12a and from the N-pole side of the permanent magnet 13 to the S-pole salient portion 12aS aligned axially with the N-pole of the permanent magnet 13, as shown in FIG. 5A.

Accordingly, each coil constituting the armature coil 3 cuts the magnetic flux of one N-pole and S-pole when the rotor 11 is rotated. However, the direction of the magnetic flux at the N-pole side is reverse to the direction of the magnetic flux at the S-pole side. Accordingly, opposite directional induced voltages are generated at the N-pole side and the S-pole side, and therefore the total induced voltage is reduced. That is, it is possible to reduce the induced voltage by controlling the magnitude of D.C. excitation current, and therefore it is possible to set the induced voltage to 0. Thus, by generating the magnetic flux whose direction is the same as that of the permanent magnet 13, it is possible to equivalently weaken (demagnetize) the field magnetic flux.

Magnetization

In the case that the direction of the magnetic flux by the D.C. excitation current is different from the magnetic flux of the permanent magnet 13 ($I_{DC}<0$), as is the same as in the $I_{DC}=0$ case, the magnetic flux due to the permanent magnet 13 is formed between the N-pole side and the S-pole side of the permanent magnet 13. Further, the magnetic flux due to the D.C. excitation coil forms a closed loop as follows: the N-pole side core 2a→gap→the N-pole side salient pole portion 2aN→the rotor core 12→the rotor yoke 14→the rotor core 12→the S-pole salient pole portion 12aS→gap→S-pole side core 2a→the armature yoke 4. As a result, the synthetic magnetic flux on the rotor surface is represented such that the magnetic flux lines are directed from the N-pole side of the permanent magnet 13 to the N-pole salient pole portion 12aN adjoining to the N-pole side of the permanent magnet 13 along the circumferential direction, and from the S-pole salient pole portion 12aS to the S-pole side of the permanent magnet 13 adjoining to the S-pole salient pole portion 12aS in the circumferential direction, as shown in FIG. 5C. Accordingly, in each coil constituting the armature coil 3 passing through slots along the axial direction, the direction of the magnetic flux cutting at the N-pole side is the same as that of the magnetic flux cutting at the S-pole side, and therefore the total induced voltage is increased. That is, it is possible to increase the induced voltage by controlling the magnitude of D.C. excitation current, and therefore it is possible to set the induced voltage to 0. Thus, by generating the magnetic flux whose direction is opposite to that of the permanent magnet 13, it is possible to equivalently magnetize the field magnetic flux.

Therefore, by continuously changing the direction and size of the D.C. excitation current, it is possible to continuously change the field magnetic flux within the range magnetization Æ0 Æ demagnetization. This enables the change of the maximum rotation speed to continuously change.

FIGS. 6A to 8B show the analytic data by means of a finite element method of the respective magnetic flux condition of FIGS. 5A, 5B and 5C. The analytic data is obtained by the approximation in two dimensions and shows a portion of N-pole of the permanent magnet 13 and N-pole salient pole portion 12aN adjoining with each other of an 8-pole type. D.C. excitation is applied by D.C. electric current from both circumferential ends of the gap. The boundary surfaces of the armature 1 and the rotor 12 are treated to be free upon taking into consideration with the yoke thereof. An equivalent current is applied to the permanent motor.

Figure 6A:
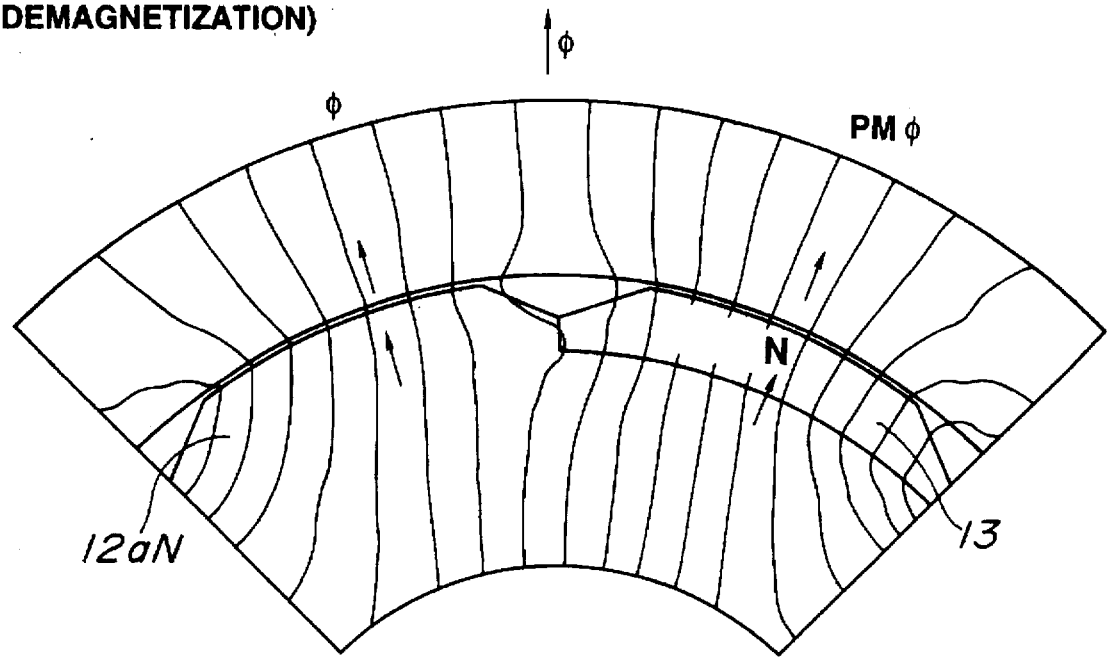
FIGS. 6A and 6B are a map and a chart of a magnetic flux under a demagnetization condition.
Figure 6B:
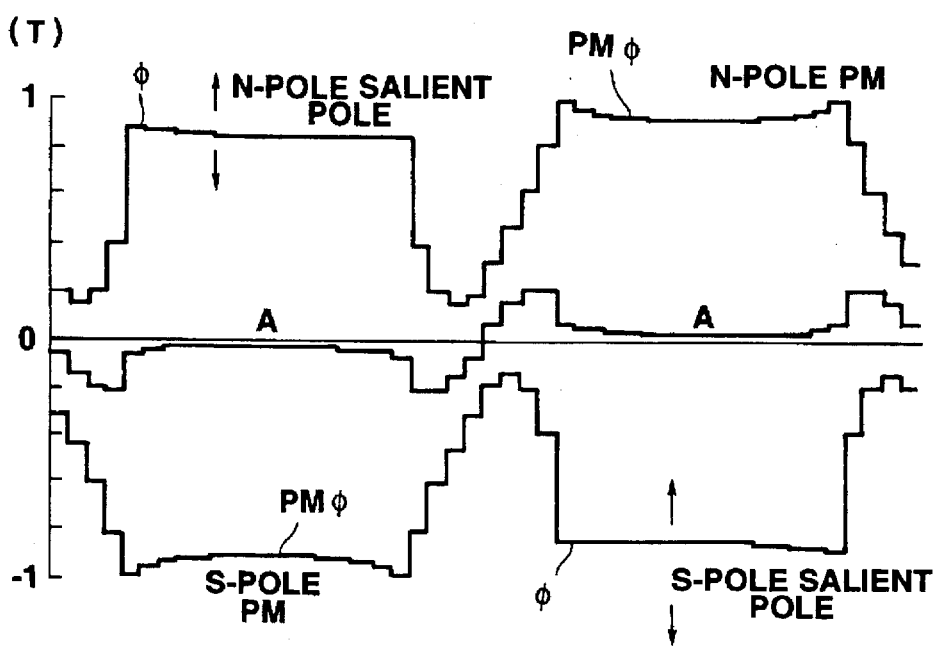

FIGS. 6A and 6B show the analytic data relating to the demagnetization as shown in FIG. 5A, and the direction of the magnetic flux of the D.C. excitation coil is the same as that of the permanent magnet. That is, when the D.C. magnetic flux $\phi$ is applied to the motor as shown in FIG. 6A, the magnetic flux $\phi$ of the permanent magnet 13 passes through the armature 1, and the magnetic flux $\phi$ of the N-pole salient pole portion 12aN passes through the armature. FIG. 6B shows quantitative data of FIG. 5A, and shows in its upper-half part that the D.C. magnetic flux passes through the N-pole salient pole portion 12aN relative to the magnet flux $\phi$ of the N-pole side of the permanent magnet 13. Further, FIG. 6B shows in its lower-half part that the magnetic flux PM$\phi$ passes through the S-pole side of the permanent magnet 13 and the S-pole salient pole portion 12aS, respectively which exist at a back surface of the paper of FIG. 6A. In accordance with the increase and decrease of the D.C. electric current, the number of the magnetic flux lines passing through the N-pole salient pole portion 12aN in FIG. 6A is compressed and decompressed, and the height of the magnetic flux $\phi$ of the N-pole salient pole portion 12aN of FIG. 6B is changed into high or low. In accordance with this change, the height of the magnetic flux $\phi$ of the N-pole salient pole portion 12aS is changed. Therefore, the synthetic magnetic flux A takes a small value as shown in FIG. 6B, and more particularly, the synthetic magnetic flux approaches 0 when the magnetic flux PM$\phi$ of the permanent magnet 13 becomes the same as the magnetic flux $\phi$ of the salient pole portion.

Figure 7A:
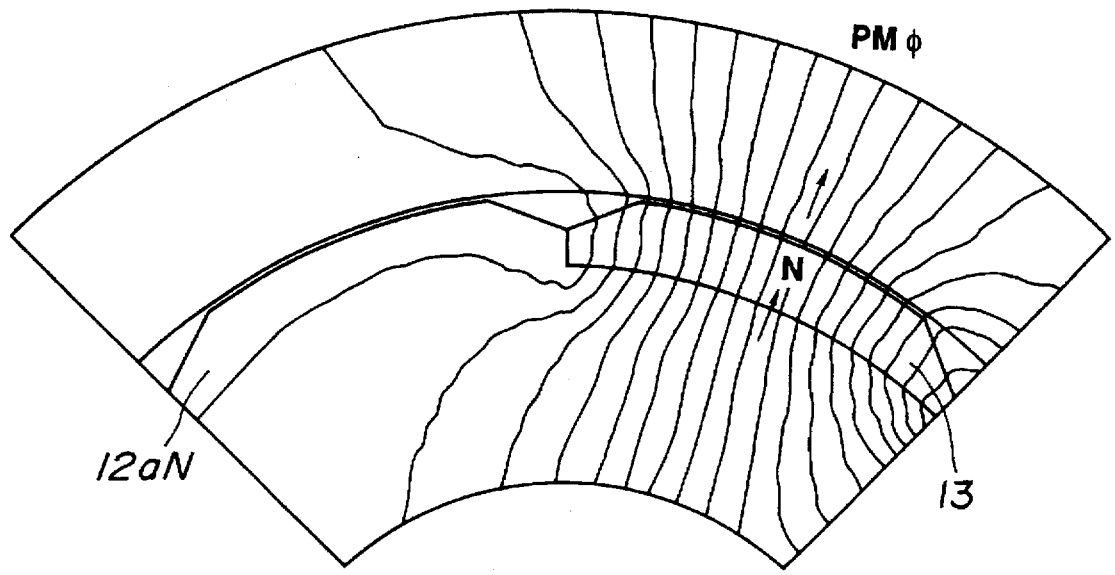
FIGS. 7A and 7B are a map and a chart of a magnetic flux under a stationary condition.
Figure 7B:
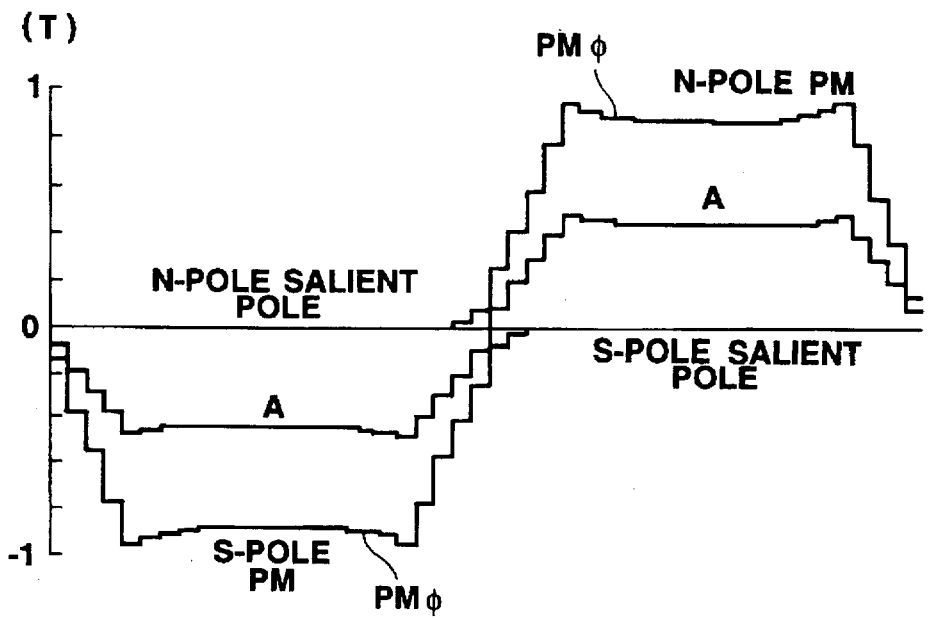
Figure 8:
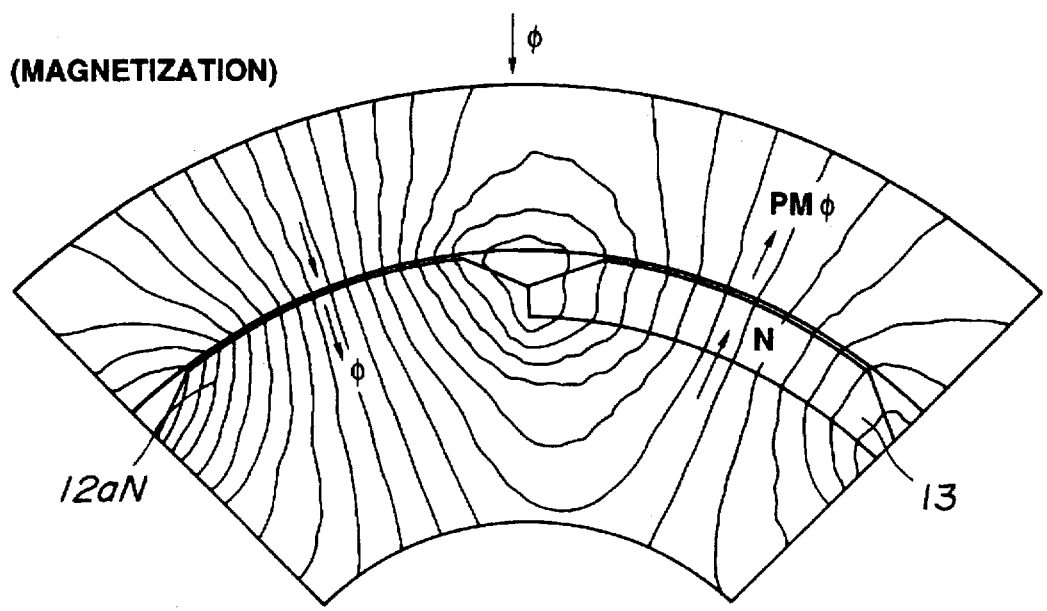
FIGS. 8A and 8B are a map and a chart of a magnetic flux under magnetization.
Figure 8:
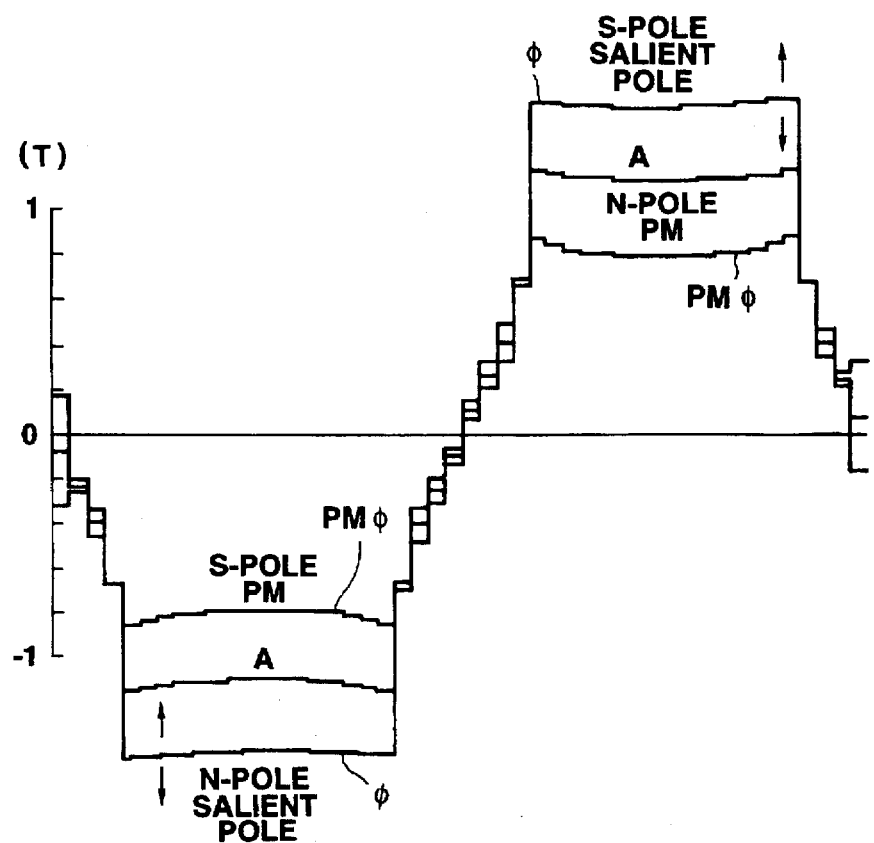

FIGS. 7A and 7B show the analytic data relating to the magnetic flux condition of FIG. 5B and shows a case in that D.C. excitation current =0. That is, the magnetic flux lines due to the N-pole side of the permanent magnet 13 are only formed, and no magnetic flux by the N-pole salient pole portion is formed.

As a result, the magnetic flux PM$\phi$ of the N-pole of the permanent magnet 13 and the magnetic flux PM$\phi$ of the S-pole of the permanent magnet 13 on the back side of the paper of FIG. 7B exist. Accordingly, a constant synthetic magnetic flux A passes through the armature 1.

FIGS. 8A and 8B show the analytic data relating to the magnetization in that the direction of the magnetic flux by the D.C. excitation coil is different from (opposite to) the direction of the magnetic flux of the permanent magnet. That is, when the DC magnetic flux $\phi$ is applied to a portion shown in FIG. 8A, the magnetic flux PM$\phi$ passes from the N-pole of the permanent magnet 13 to the armature 1, and passes from the armature 1 to the N-pole salient pole portion 12aN. FIG. 8B shows quantitative data of FIG. 5C, and shows in its upper-half part that the D.C. magnetic flux passes through the N-pole salient pole portion 12aN relative to the magnet flux PM$\phi$ of the N-pole side of the permanent magnet 13. Further, FIG. 8B shows in its lower-half part that the magnetic flux PM$\phi$ passes through the S-pole side of the permanent magnet 13 and the S-pole salient pole portion 12aS, respectively which exist at a back surface of the paper of FIG. 8A. As a result, the synthetic magnetic flux A becomes larger than the magnetic flux PM$\phi$, and the magnetic flux of the salient pole portion is vertically changed according to the change of the D.C. magnetic flux $\phi$, and therefore the synthetic magnetic flux is changed.

Figure 9:
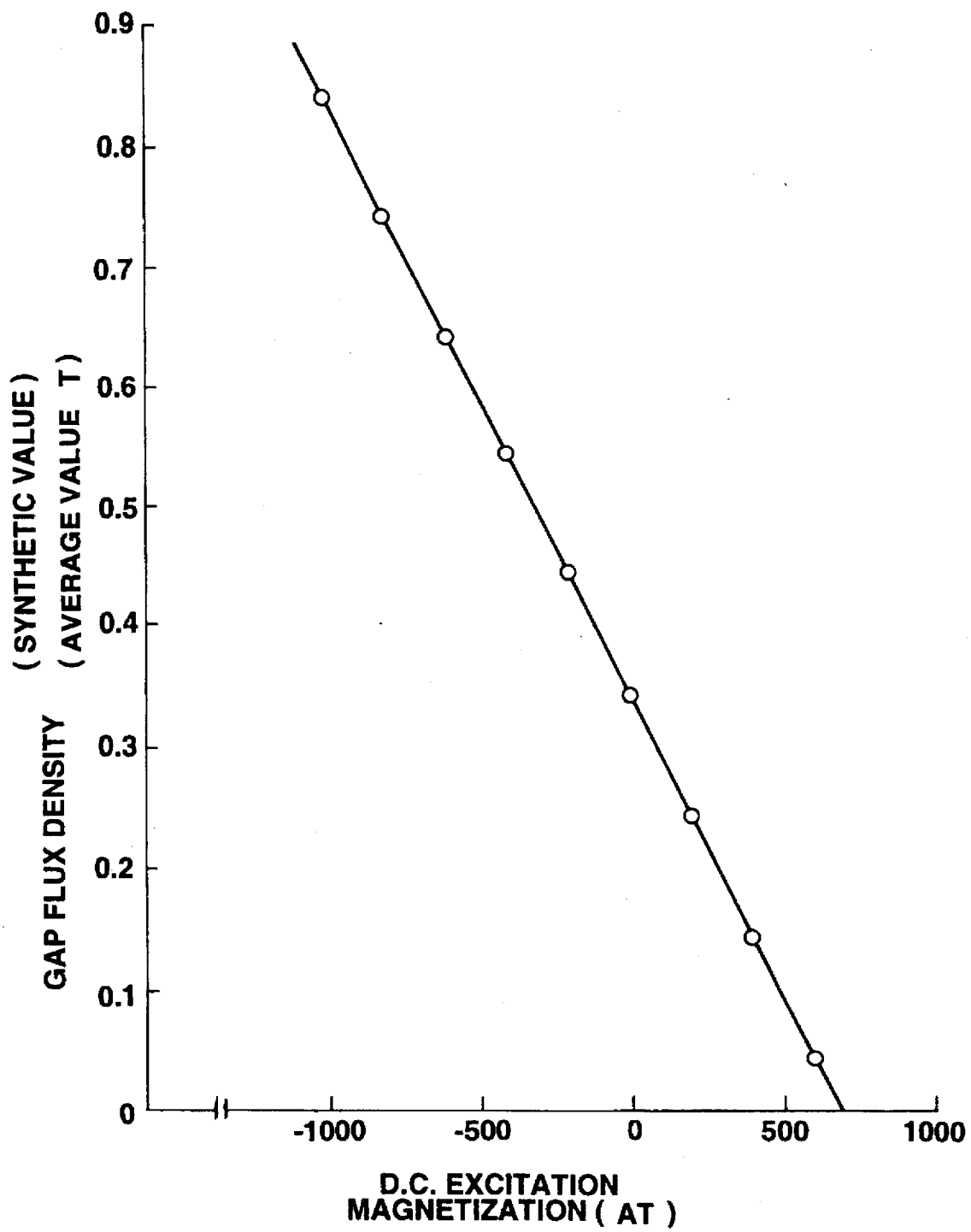
FIG. 9 is a graph which shows a relationship between the D.C. excitation and gap magnetic flux density.

FIG. 9 shows a relationship between the D.C. excitation and the gap magnetic flux density. As is clear from FIG. 9, when the D.C. excitation is magnetized from a stationary, the synthetic gap magnetic flux density is increased, and when demagnetized, the synthetic gap magnetic flux density is decreased. Therefore, it is noted that the change of the field magnetic flux can be implemented by changing the direction and size of the current to the excitation coil 5.

Figure 10:
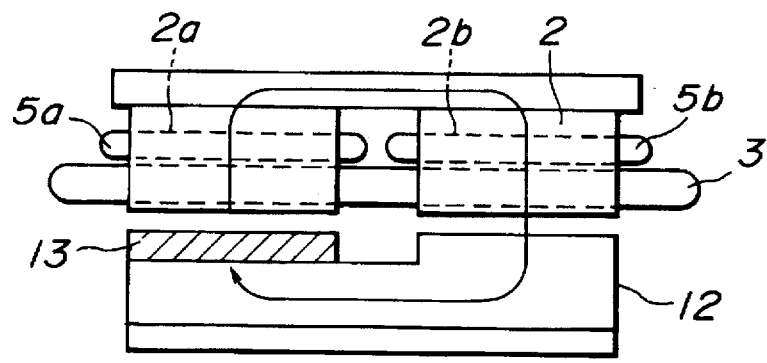
FIGS. 10A, 10B and 10C are explanatory views of a second embodiment of the motor according to the present invention.
Figure 10:
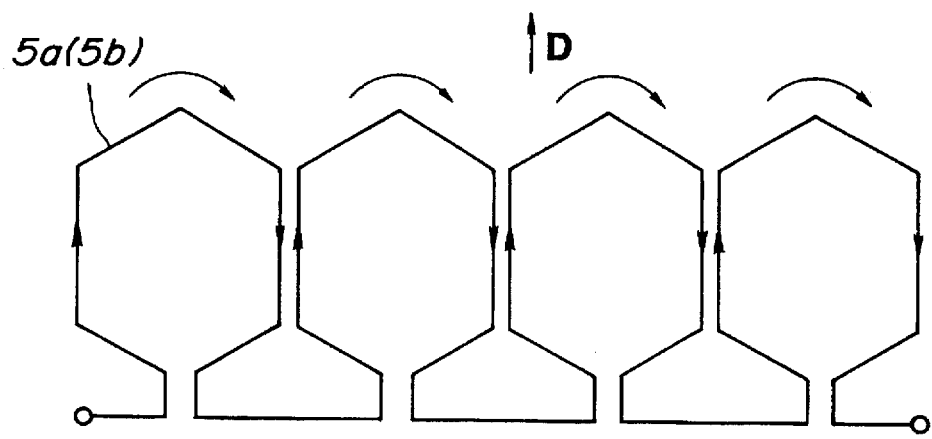
Figure 10:
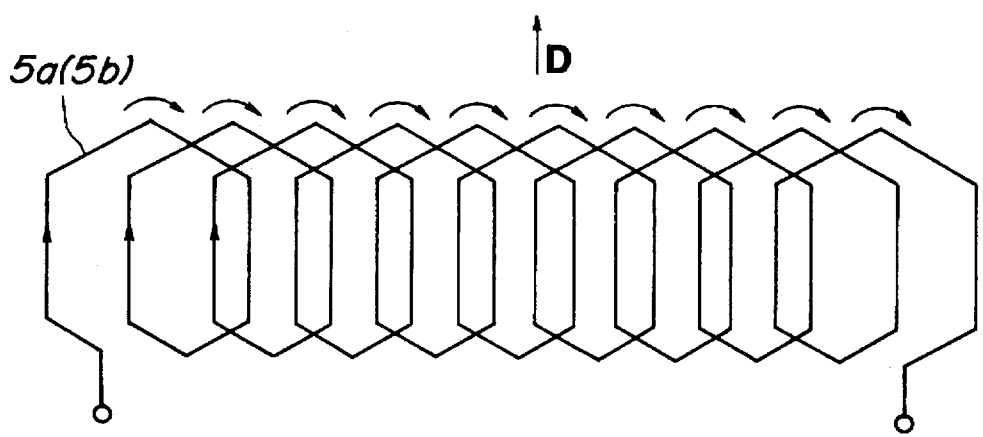
Figure 11:
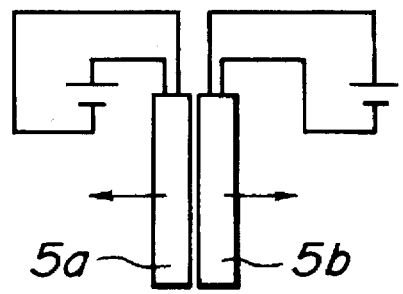
FIG. 11 is a schematic diagram which shows a modification of D.C. excitation coils having reverse polarity.

FIGS. 10A to 17 show some modifications of the first embodiment of the above-mentioned motor. Although the D.C. excitation is implemented by flowing D.C. electric current to the excitation coil 5 of FIG. 1 of a ring-shape, it will be understood that hexagonal-shaped coils 5a and 5b may be used for the N-pole side core 2a and the S-pole side core 2b of the armature core 2, respectively, as shown in FIG. 10A. Further, the winding method of the hexagonal-shaped coils 5a and 5b may be a concentrated winding as shown in FIG. 10B or distributed winding as shown in FIG. 10C. Although a pitch of the coil may be voluntarily selected in these winding methods, it is preferable that the number of the turns of the coil may be as great as possible, in order to obtain a desired D.C. magnetic flux and to smoothly change the magnetic flux. FIG. 11 shows a modification of the excitation coil 5 in which a plurality of D.C. excitation coils are used instead of the one excitation coil 5 shown in FIGS. 1 and 4. By generating the reverse directional magnetic fields at the respective excitation coils 5a an 5b, it becomes possible to continuously control the magnetic flux by adjusting the size of the voltage applied to the respective coils. Accordingly, it becomes possible to omit a means for changing the direction of the magnetic flux. This enables the facilitation of the electric power source as a D.C. electric power source.

Figure 12:
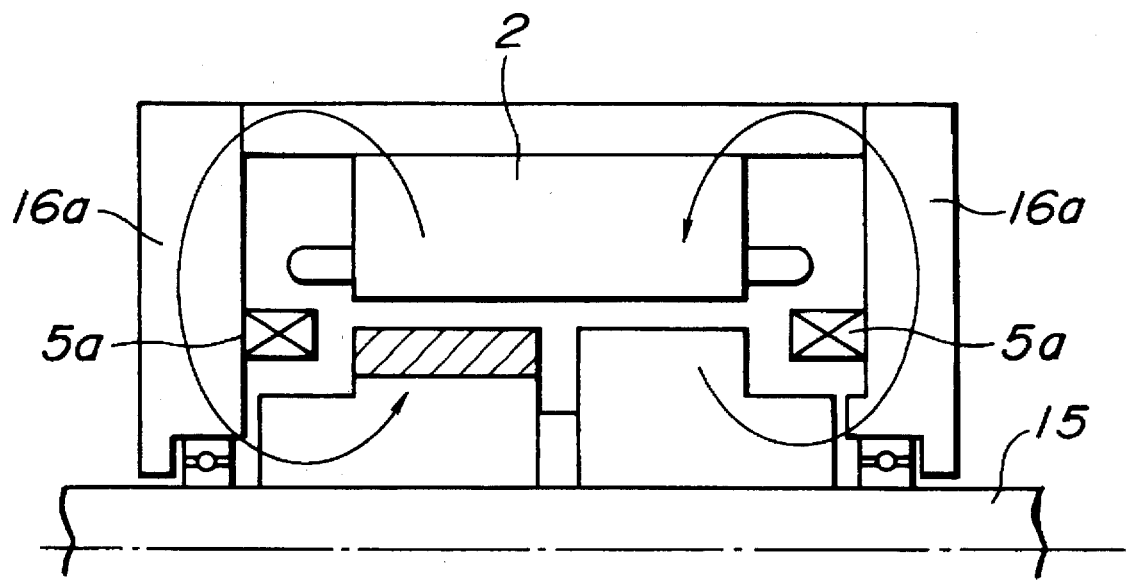
FIG. 12 is a cross-sectional view which shows a modification of the D.C. excitation coil.

FIG. 12 shows a modification of the excitation coil 5, in that the excitation coil 5 is not disposed at a center portion of the armature on the axial direction thereof. In this modification, a magnetic circuit is constituted by using brackets 16a and 16b since the armature core 2 is not separated, and it is necessary to distinguish the magnetic passage between the N-pole side and the S-pole side. The excitation coils 5a and 5b are disposed outside of the armature core 2 and attached to the brackets 16a and 16b, respectively. This facilitates forming the coil. On the other hand, it is necessary to form the shaft and the like by non-magnetic material since the magnetic circuit is formed at the brackets 16a and 16b.

Figure 13A:
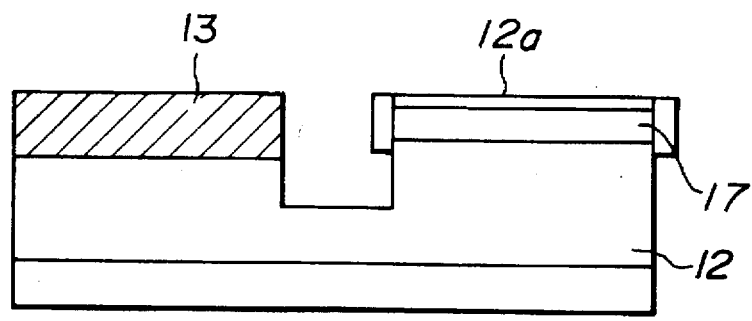
FIG. 13A is a cross-sectional view of the rotor which is modified by adding a damper coil.
Figure 13B:
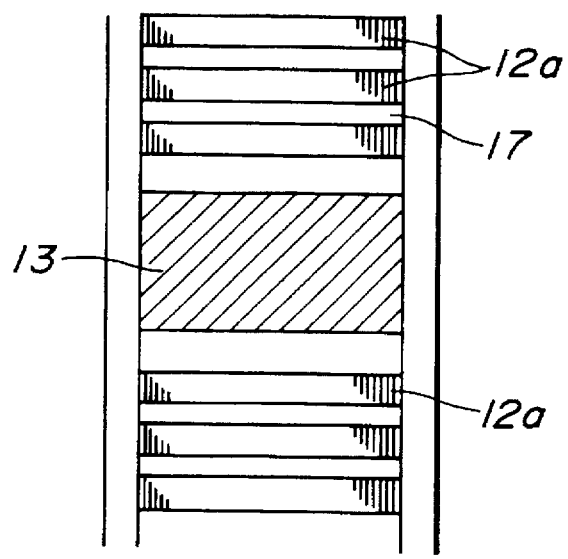
FIG. 13B is a partial plan view of the rotor of FIG. 13A.
Figure 14:
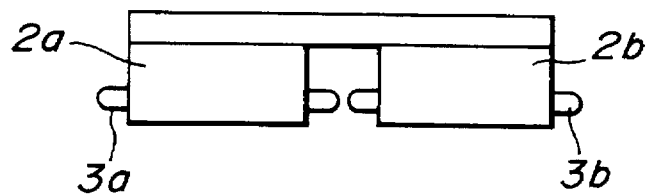
FIG. 14 is a cross-sectional view showing a modification of the armature coils.

Although the salient pole portion 12a shown in FIGS. 1 and 3 is an iron core projection, it will be understood that a damper coil 17 may be installed to the salient pole portion 12a as shown in FIGS. 13A and 13B. The damper coil 17 is connected to the end ring and is formed by means of aluminum alloy die-cast or brazed copper bar and an end ring. The form of a groove of the damper may be made properly. With this addition of the damper coil 17, it becomes possible to ensure a stable operation of the motor as a synchronous motor which does not require a normal position detection. FIG. 14 shows a deformation of the armature 1 in which the armature coils 3a and 3b are installed to the N-pole coil 2a and the S-pole coil 3b, respectively.

Figure 15A:
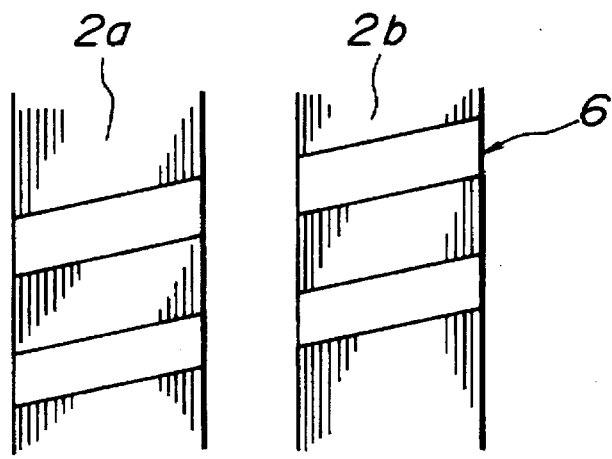
FIGS. 15A and 15B are partial plan views which show a modification of slots of the armature core.
Figure 15B:
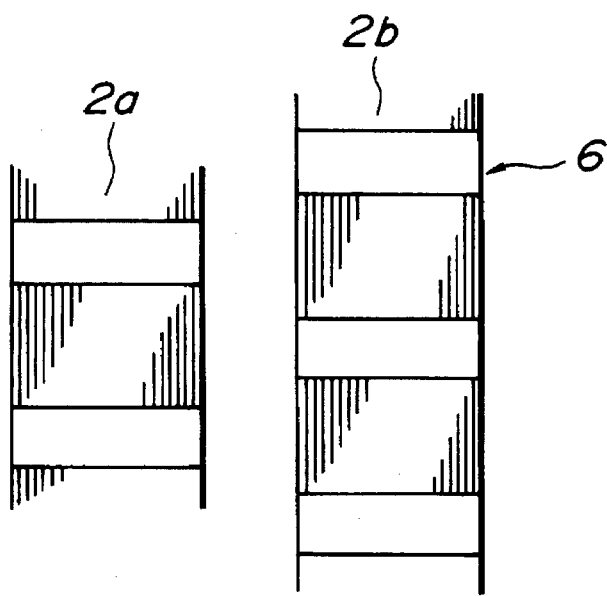

In the embodiment shown in FIGS. 1 to 9, the divided armature cores 2a and 2b may have diagonal slots 6 as shown in FIG. 15A in order to lower the high-frequency magnetic flux. If the armature core 2 is not divided as shown in FIG. 12, conventional diagonal slots may be formed. Also, the slots 6 may be formed at the N-pole core 2a and the S-pole core 2b such that slots therebetween are offset by ½ pitch intervals as shown in FIG. 15B, in order to obtain a merit as is similar to the modification of FIG. 15A.

Figure 16:
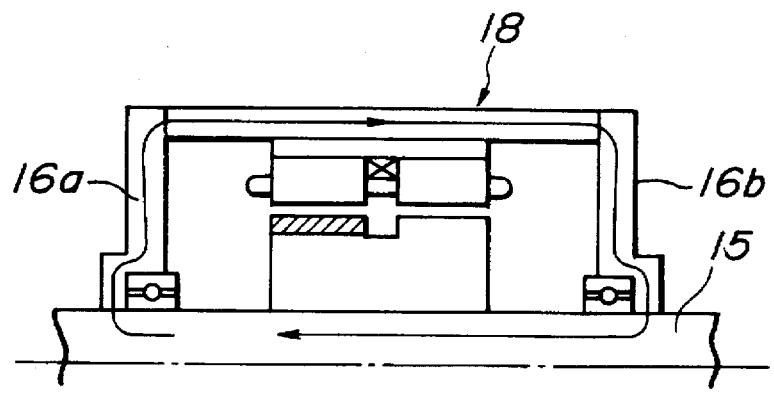
FIG. 16 is a cross-sectional view of a modification of parts using non-magnetic material.

As is similar to the modification in FIG. 12, in the modification of FIG. 16, the shaft 15 is made by a non-magnetic material in order to form a magnetic circuit, and therefore the magnetic flux by the D.C. excitation coil 5 forms a magnetic circuit as indicated by the arrow of FIG. 16. Accordingly, it is necessary to form at least one of the frame 18, the brackets 16a and 16b, and the shaft 15 of a non-magnetic material.

Figure 17:
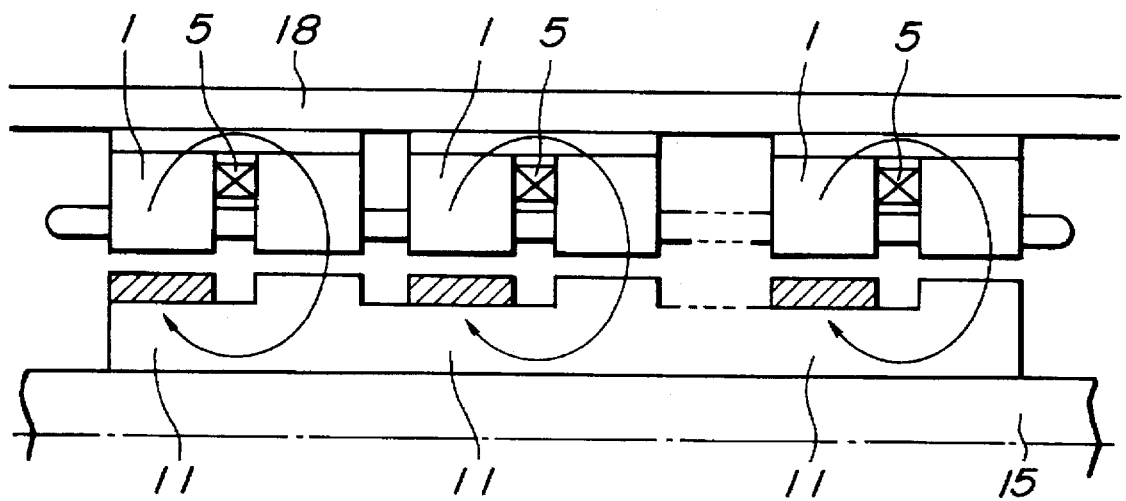
FIG. 17 is a cross-sectional view of a modification in which a plurality of motors are combined.

FIG. 17 shows a modification of an arrangement of the rotor 11 and armature 1, in which the plurality of rotors 11 and a plurality of armatures 1 are tandem arranged around the one shaft 15, respectively. This arrangement is convenient in a case where the length of a core is elongated, since it becomes possible to dividedly arrange the excitation coil 5 and the permanent magnet 13.

FIGS. 18A to 20B show electric circuits applied to the motor according to the present invention. A D.C. electric power source connected to the D.C. excitation coil 5 is formed by a chopper circuit. In this case, it is necessary that the electric current of the excitation coil flow as a function of the rotational speed of the motor and the frequency of the electric power source.

Accordingly, it is necessary to used a current command circuit and a current detecting circuit.

Figure 18A:
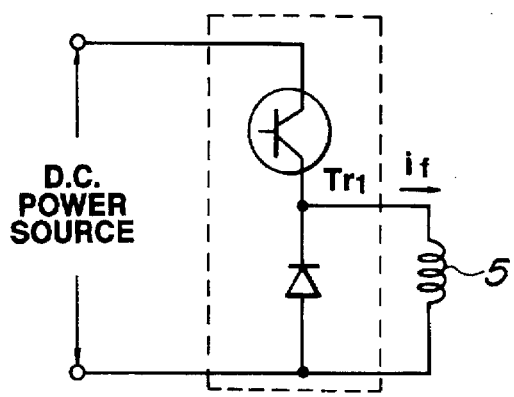
FIGS. 18A and 18B are various circuit diagrams of a chopper circuit.
Figure 18B:
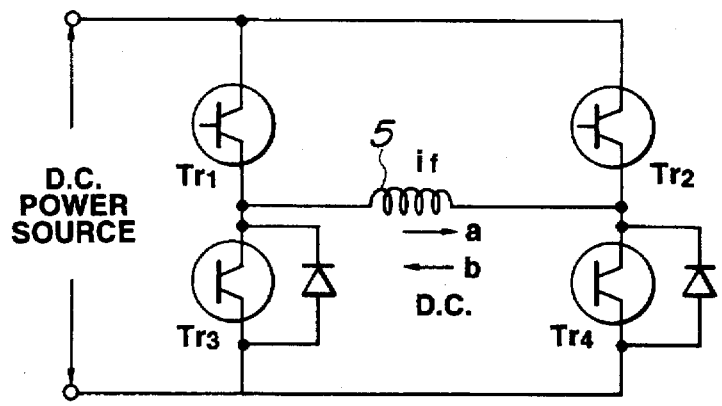

FIG. 18A shows a single-pole type chopper circuit in which D.C. electric current is controlled in a single direction by the switching of a transistor Tr1. Accordingly, this circuit is applied to either area of FIG. 9 in that the D.C. excitation is changed from 0 to a minus side or from 0 to a plus side. On the other hand, FIG. 18B shows a bridge type chopper circuit by which it becomes possible to bidirectionally flow D.C. electric current to the excitation coil 5. Accordingly, it is possible to apply this circuit of FIG. 18B to all areas of FIG. 9. Furthermore, if a magnet switch or static switch for changing the polarity of the D.C. current is applied to the single-pole type chopper circuit, such an arranged chopper circuit can be used in the control of all areas of FIG. 9.

Figure 19:
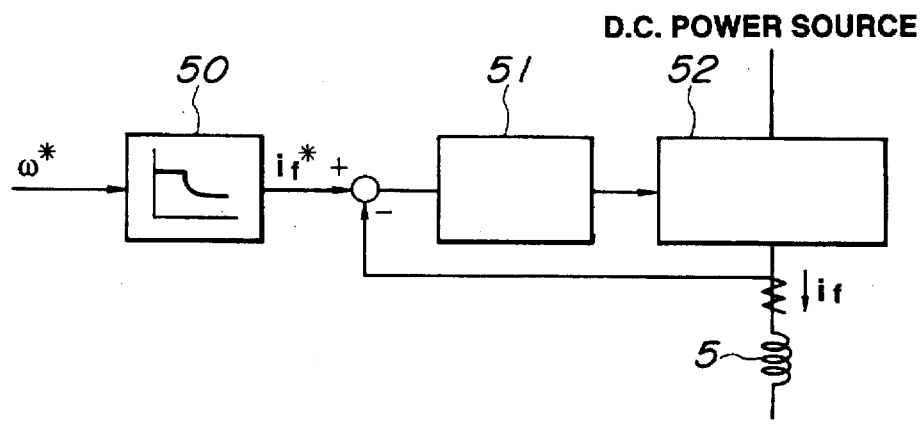
FIG. 19 is a circuit diagram of an excitation circuit for the excitation coil of the motor according to the present invention.
Figure 20:
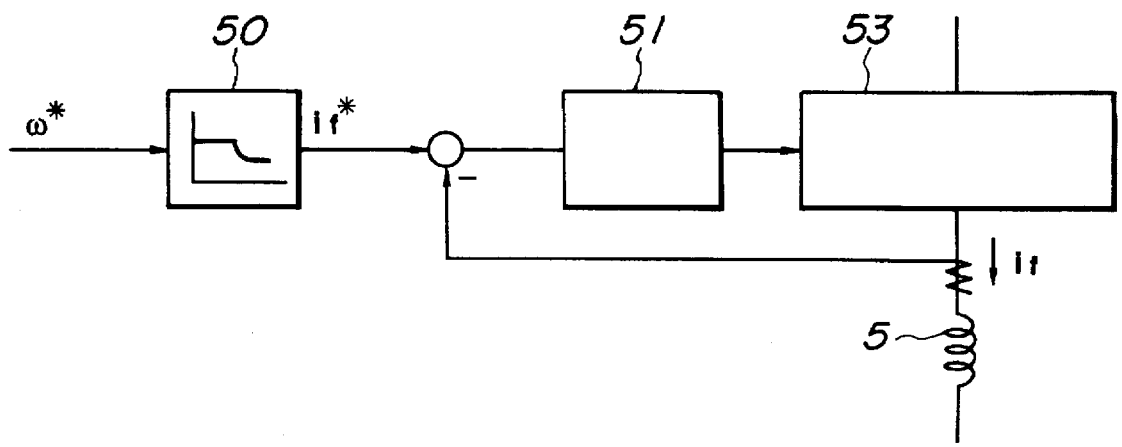
FIGS. 20A and 20B are circuit diagrams of other excitation circuits.
Figure 20:
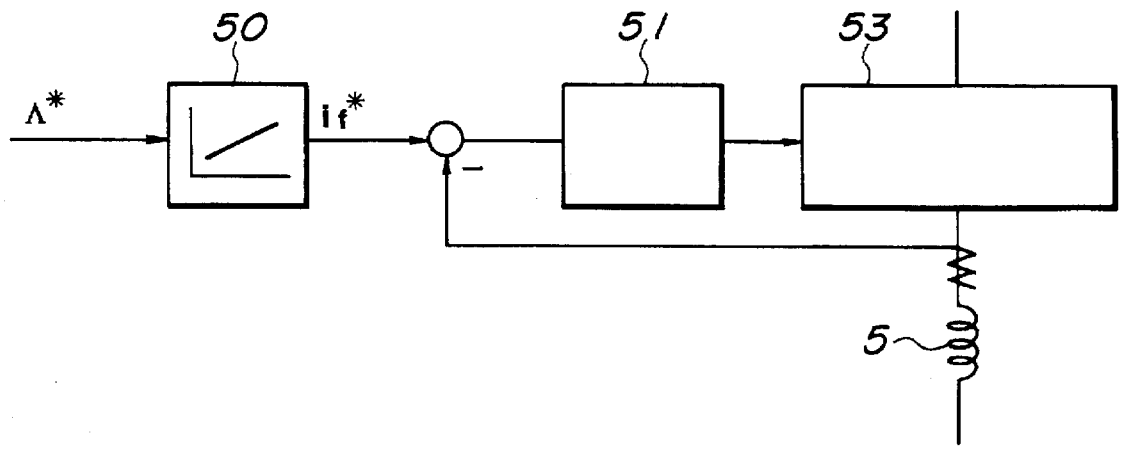

FIG. 19 shows a control circuit having a chopper circuit for generating D.C. electric current of the D.C. excitation coil. A command value $\omega^*$ on the basis of the frequency of the electric power source and the rotation speed of the motor is inputted to the control circuit and a corresponding D.C. electric current is outputted from a current preset device 50. The outputted current value $i_f^*$ from the current preset device 50 is compared with the detected value $i_f$ and is supplied to the chopper circuit 52 through ACR amplifier (automatic current control amplifier). The command value $\omega^*$ is applied to an inverter circuit (not shown) for controlling the motor.

FIG. 20A shows an electric circuit in which a D.C. electric power source 53 such as a three-phase bridge circuit or single-phase bridge circuit is used instead of the chopper circuit. FIG. 20B shows an electric circuit in which the current preset device 50 is arranged such that a field magnetic flux command $A^*$ is inputted instead of the command value $\omega^*$. In such a current preset device 50, the preset pattern thereof becomes different from that in a case where the command value $\omega^*$ is inputted.

Figure 21:
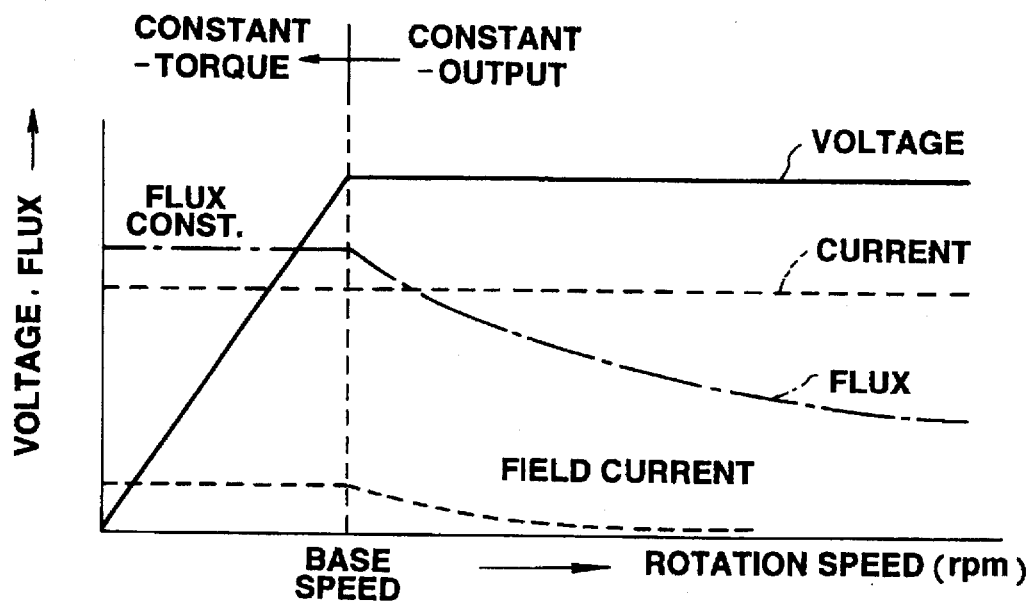
FIG. 21 is a graph which shows characteristics of the motor according to the present invention.

In the embodiment described hereinabove, since the field magnetic flux is freely controlled, it is possible that the induced voltage by the magnetic field is kept constant so as to keep a maximum rotation speed by decreasing the magnetic flux in reverse-proportion relative to the rotation speed, as shown in FIG. 21. This broadens the constant-output area of the motor according to the present invention.

In this embodiment, by reducing the gap between the salient pole portion and the armature as possible, it becomes possible to obtain a sufficient excitation by a small current. Accordingly, the excitation input becomes small as compared with the total loss of the motor, and therefore the motor according to the present invention performs with an extremely high efficiency.

Figure 22:
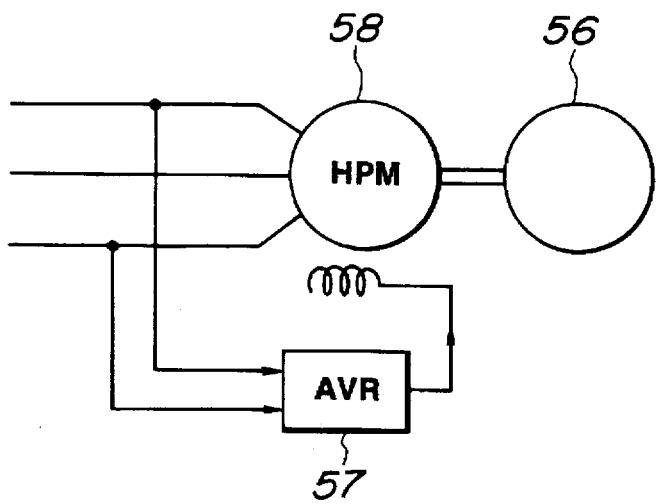
FIG. 22 is a schematic diagram which shows a circuit structure when the motor according to the present invention is used as a generator.

Although the explanation as mentioned above is as to the permanent magnet motor, it is possible to use this motor as a generator. For example, it is possible to control a permanent magnet motor 58 by means of an excitation current control of AVR 57 upon connecting the permanent magnet motor 58 to a driving source 56 such as an engine, as shown in FIG. 22.

Figure 23:
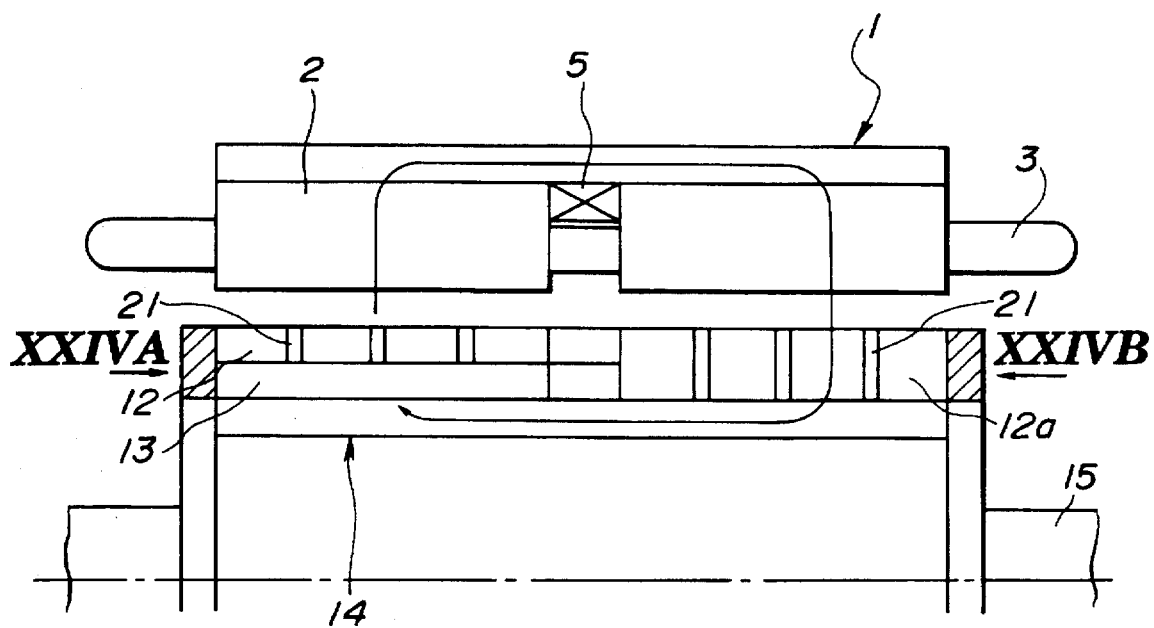
FIG. 23 is a cross-sectional view of an embedded type motor which is a modification of FIG. 1.

FIG. 23 shows a permanent magnet motor of an embedded type. The plurality of the permanent magnets 13 are installed on the yoke 14 of the rotor 12 so as to be circumferentially arranged at equal intervals. Each of rotor cores 12 is arranged on each of the permanent magnets 13.

Figure 24A:
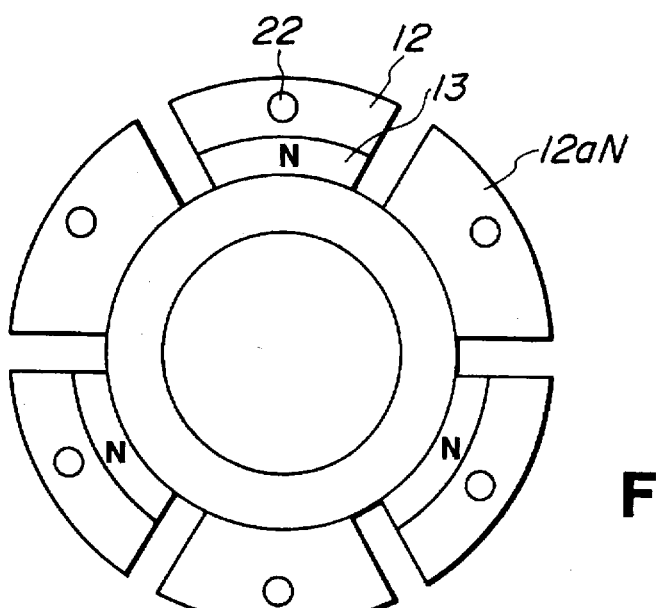
FIGS. 24A, 24B and 24C are plan views of parts of FIG. 23.
Figure 24B:
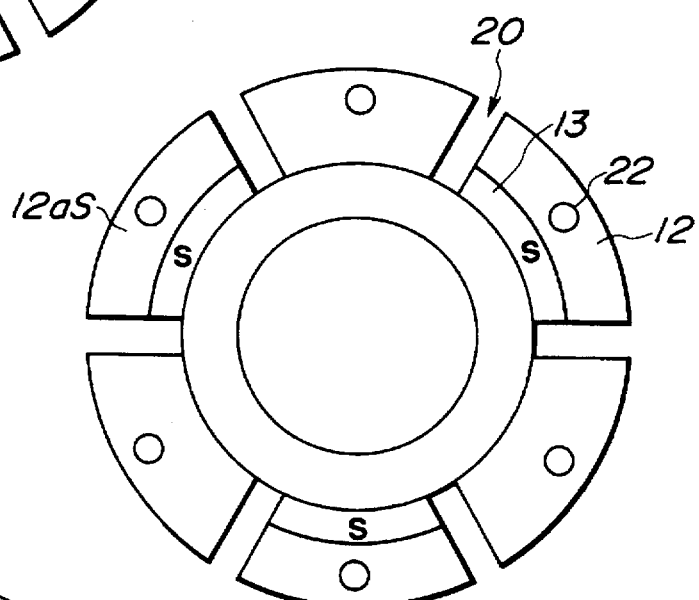
Figure 24C:
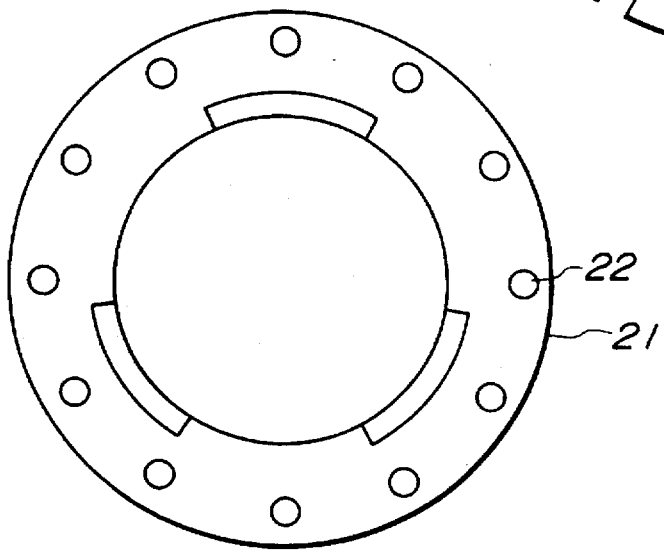

With this arrangement, the permanent magnets 13 are individually formed and installed on the yoke 14, and the rotor cores 12 are individually disposed on an upper side of the permanent magnets 13. Accordingly, the permanent magnets 13 and the salient pole portions 12a are separately arranged through the slits 20. For the purpose of the interconnect and reinforcement of them, non-magnetic reinforcement plates 21 of a disc shape shown in FIG. 24C are disposed at several portions. Therefore, as shown in FIG. 24A, the N-pole side of the permanent magnet 13 and the rotor core 12, and the N-pole salient pole portion 12aN are disposed around the yoke 14 through the slit 20 and form the N-pole side. Similarly, as shown in FIG. 24B, the S-pole side of the permanent magnet 13, the rotor core 12, and the S-pole salient pole portion 12aS are disposed around the yoke 14 through the slit 20 and form the S-pole side.

The non-magnetic reinforcement plates 21 are disposed at several portions along the axial direction. The non-magnetic reinforcement plates 21, the salient pole portions 12a and the rotor cores 12 are integrally fitted with each other by inserting an aluminum-alloy die-cast member or copper bar to the slots 22. The inserted aluminum-alloy die-cast member or copper bar functions as a damper coil. An end ring is disposed at both axial ends of the rotor by means of aluminum-alloy die-cast or brazing.

With this embedded type motor, due to the slits 20, a quadrature-axis reactance becomes greater than a direct-axis reactance so as to be similar to a conventional embedded type permanent magnet motor. Accordingly, the controllability thereof is improved.

FIGS. 25A, 25B, 25C and 25D show several modifications for reducing the quadrature-axis reactance. For example, slits 20 are disposed at the salient pole portions 12a or the rotor core 12, the width of the salient pole portion 12a is changed, and the width of the gap is changed. A terminal voltage applied to the motor is a vector sum of the induced voltage by the field magnetic flux and the voltage drop by the coil impedance. The induced voltage is reduced by the magnetic flux control by the D.C. excitation coil. In order to broaden the operable area, it is effective to minimize the amount of voltage drop due to the impedance.

Figure 25A:
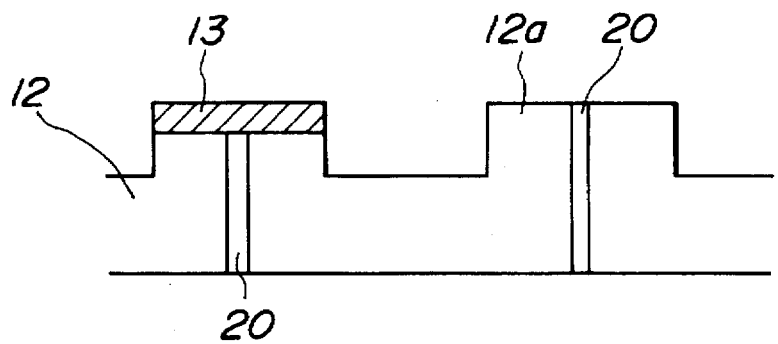
FIGS. 25A, 25B, 25C and 25D are cross-sectional views which show various modifications for reducing the quadrature-axis reactance.
Figure 25B:
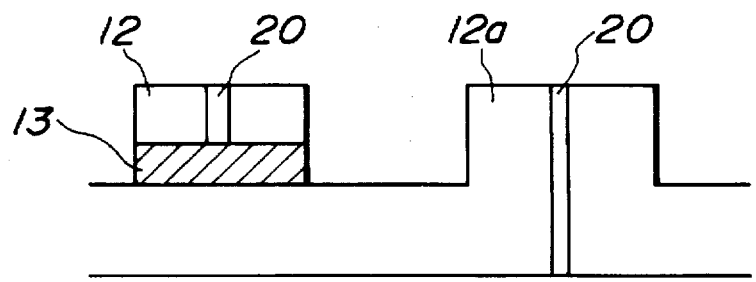
Figure 25C:
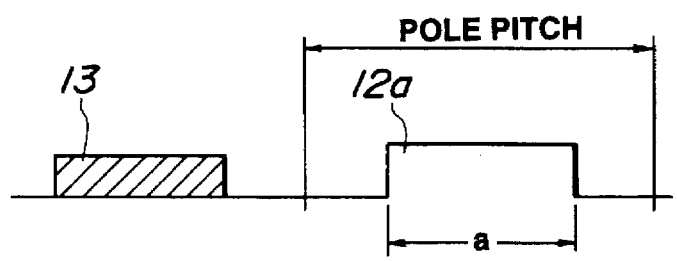
Figure 25D:
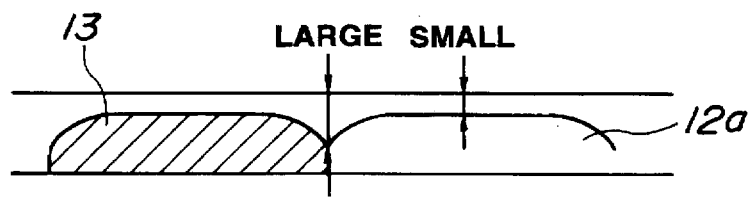

FIG. 25A shows a structure of a permanent magnet motor of a surface-mounting type in which the slits 20 are formed in the rotor core 12 supporting the permanent magnet 13 and the salient pole portion 12a so as to reduce the quadrature-axis reactance. FIG. 25B shows a structure of a permanent magnet motor of an embedded type in which the slits 20 are formed in the rotor core and the salient pole portion 12a for the reduction of the quadrature-axis reactance. FIG. 25C shows a structure of a PM motor in which the salient pole portion 12a is formed such that its width is smaller than the pole-pitch for the reduction of the quadrature-axis reactance. FIG. 25D shows a structure of a PM motor in which the permanent magnet 13 and the salient pole portion 12a are formed such that the gap at the both end portion of the salient pole portion is smaller than that at the center portion of the salient pole portion.

Next, a tandem type synchronous motor according to the present invention will be discussed hereinafter. This type motor has a structure that right and left both sides rotors are arranged to be engaged with each other, and therefore it is not necessary to divide the rotor in the axial direction.

Figure 28A:
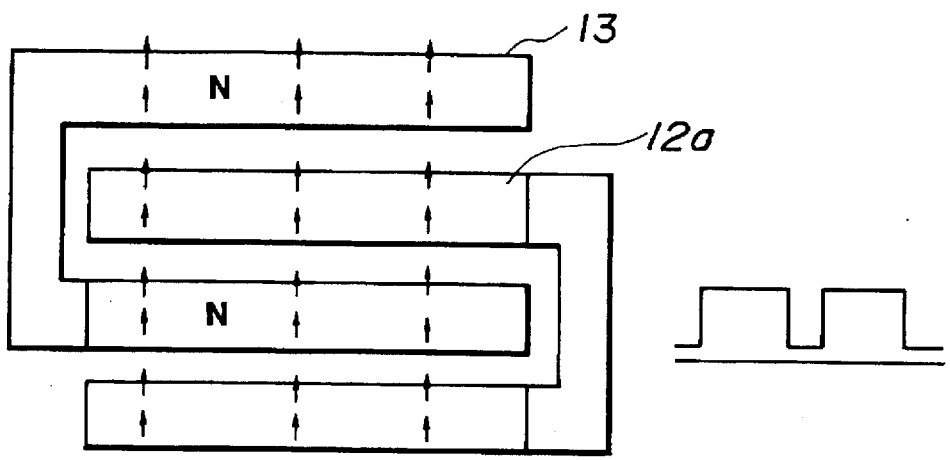
FIGS. 28A, 28B and 28C are explanatory views of the magnetic flux lines of FIG. 26.
Figure 28B:
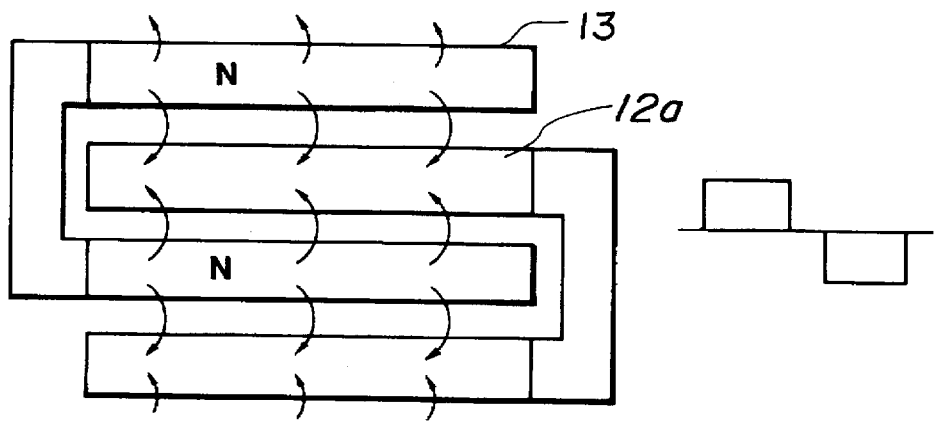
Figure 28C:
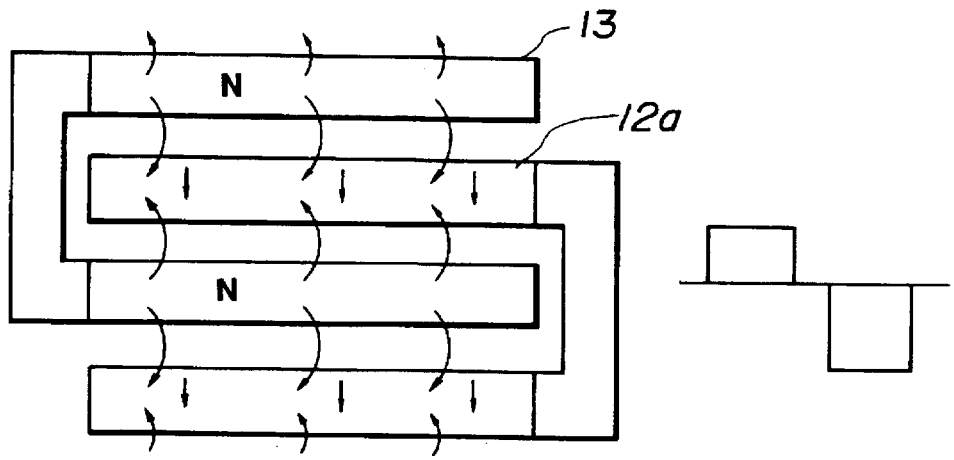

As shown in FIG. 26, the N-pole side of the permanent magnet 13 is attached on the whole surface of the rotor 12c of a left-pole side, and the surface of the other rotor 12d of a right-pole side is treated as a salient pole portion 12a. The D.C. excitation coil 5 is disposed relative to the right-pole rotor 12d. Accordingly, the N-pole side of the permanent magnet 13 and the salient pole portions are alternately arranged in the circumferential direction, as shown in FIGS. 27A and 27B. In the field magnetic control of the rotor, the induced voltage to the armature coil 3 is reduced by applying the electric current to the D.C. excitation coil 5 so as to pass the magnetic flux whose direction is the same as that of the magnetic flux passing through the N-pole side of the permanent magnet 13, as shown in FIG. 28A. When the electric power is not applied to the D.C. excitation coil 5 as shown in FIG. 28B, the magnetic flux of the permanent magnet 13 passes through the armature coil 3 and a predetermined voltage is induced therein. When the electric power is applied to the D.C. excitation coil 5 such that the magnetic flux whose direction is opposite to that of the N-pole side of the permanent magnet 13 passes through the excitation coil 5 as shown in FIG. 28C, the induced voltage of the armature coil 3 is increased. Thus, by changing the size and direction of the electric current applied to the D.C. excitation coil 5, the field magnetic flux is continuously changed.

Figure 29:
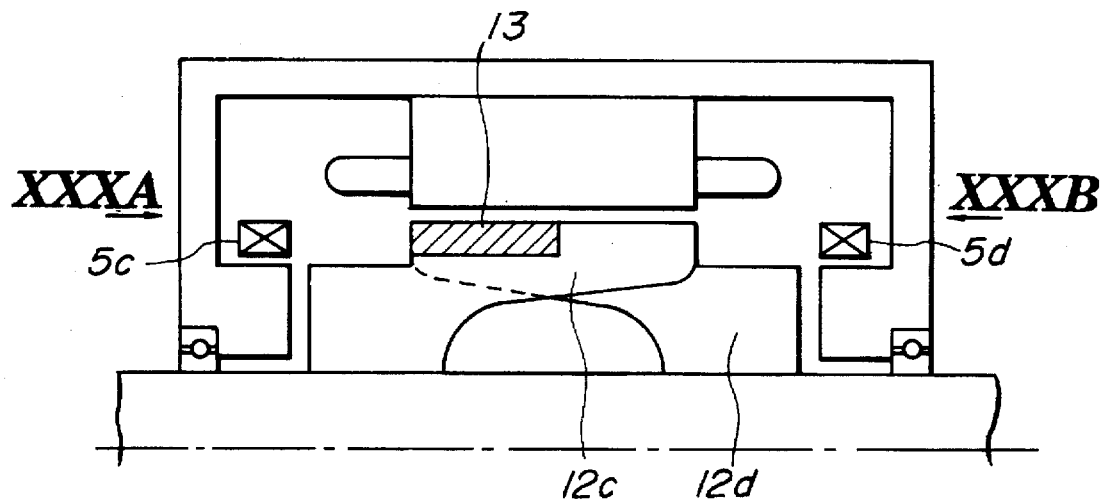
FIG. 29 is a cross-sectional view of another modification of the motor into the tandem type.
Figure 29:
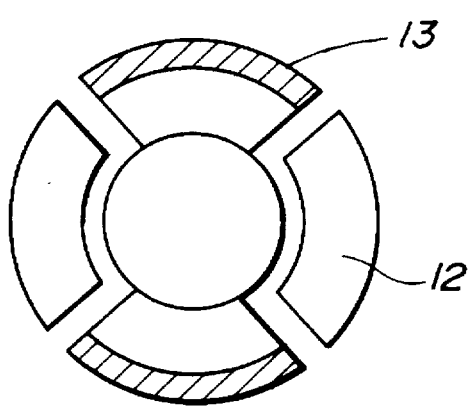
Figure 29:
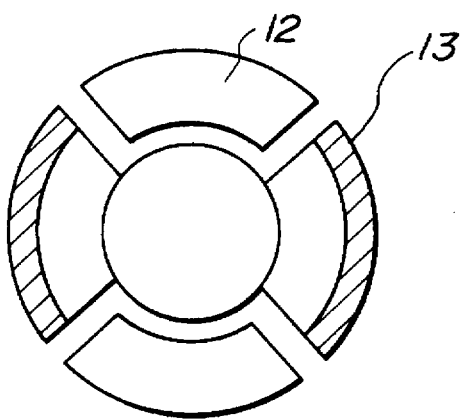
Figure 30C:
FIG. 30C is an explanatory view for rotor cores of FIG. 29.
Figure 30C:
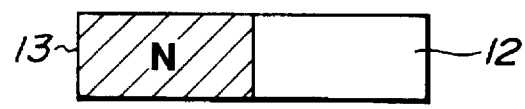
Figure 31:
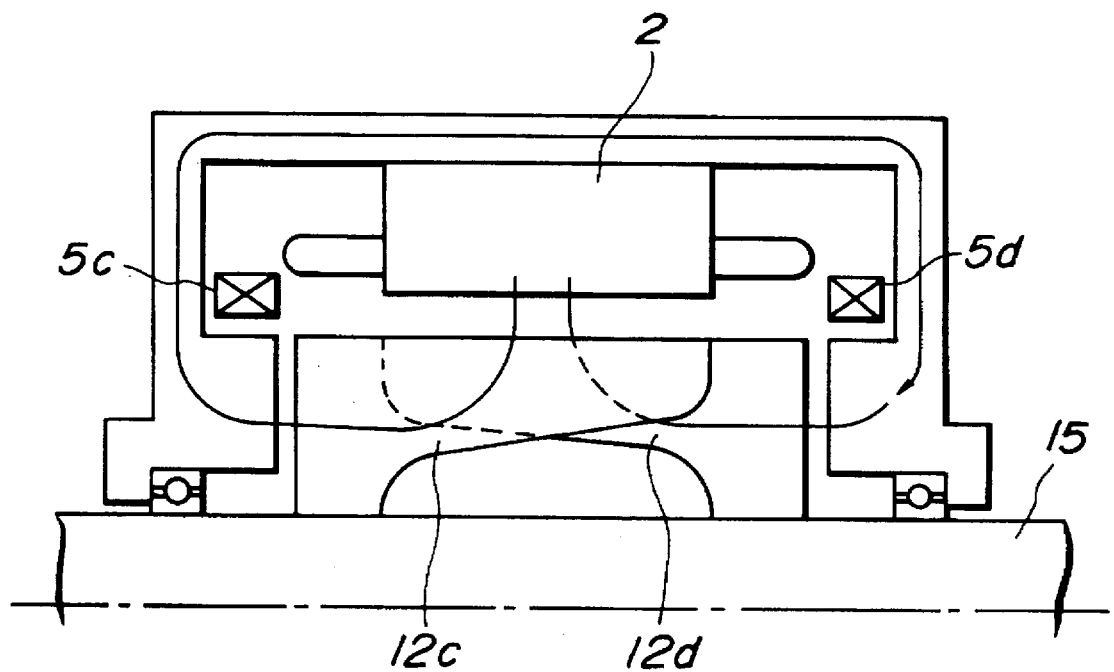
FIG. 31 is a cross-sectional view of another modification of the motor into the tandem type.
Figure 32A:
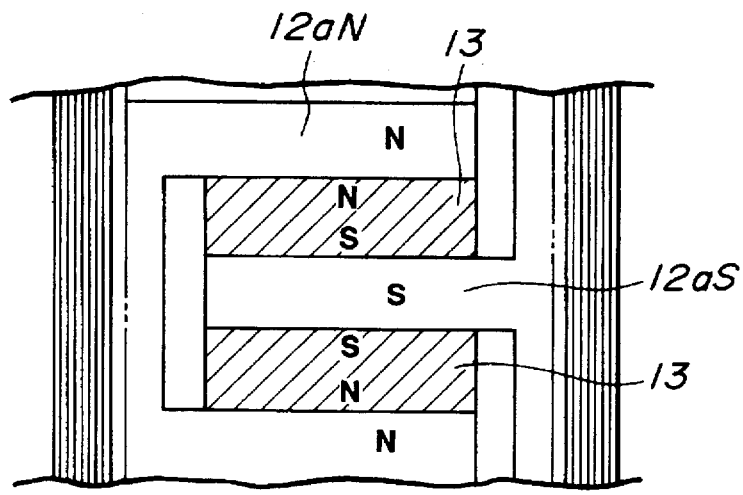
FIG. 32A is a plan view of the rotor of FIG. 31.
Figure 32B:
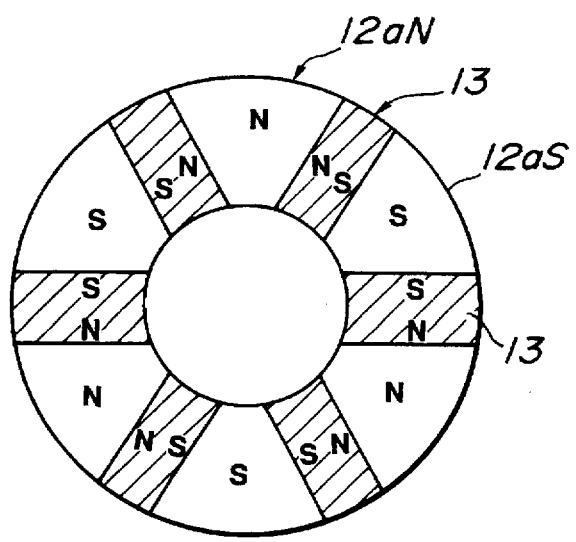
FIG. 32B is a side of the rotor of FIG. 31.
Figure 32C:
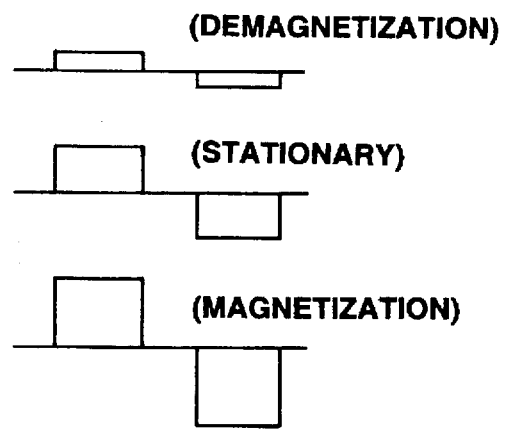
FIG. 32C is a graph which shows changes of induced voltage according to the change of the magnetic flux of the permanent magnet.

FIG. 29 shows a modification of a tandem type motor in which the N-pole side of the permanent magnet 13 is attached on a half portion of the surface of the left-pole side rotor 12c and the S-pole side of the permanent magnet 13 is attached on a half portion of the surface of the right-pole side rotor 12d. The D.C. excitation coils 5c and 5d are installed relative to the left-pole side and the right-pole side, respectively. As shown in FIGS. 30A and 30B, the rotors 12c and 12d of a tandem type motor are disposed to the N-pole side and the S-pole side, respectively. That is, the arrangement of FIG. 29 is a modification of the embodiment shown in FIG. 3 to a tandem type motor, as shown in FIG. 30C.

FIGS. 31, 32A, 32B and 32C show another modification of the tandem type motor in which the left-pole side rotor 12c and the right-pole side rotor 12d are arranged to be N-pole salient pole portion 12aN and the S-pole salient pole portion 12aS, and the permanent magnets 13 are sandwiched by the rotors 12c and 12d. With this arrangement, by controlling the electric current applied to the D.C. excitation coils 5c and 5d for the left-pole side and the right-pole side, the magnetic flux of the permanent magnets 13 is variably changed. This change enables the control of the induced voltage.

Figure 33:
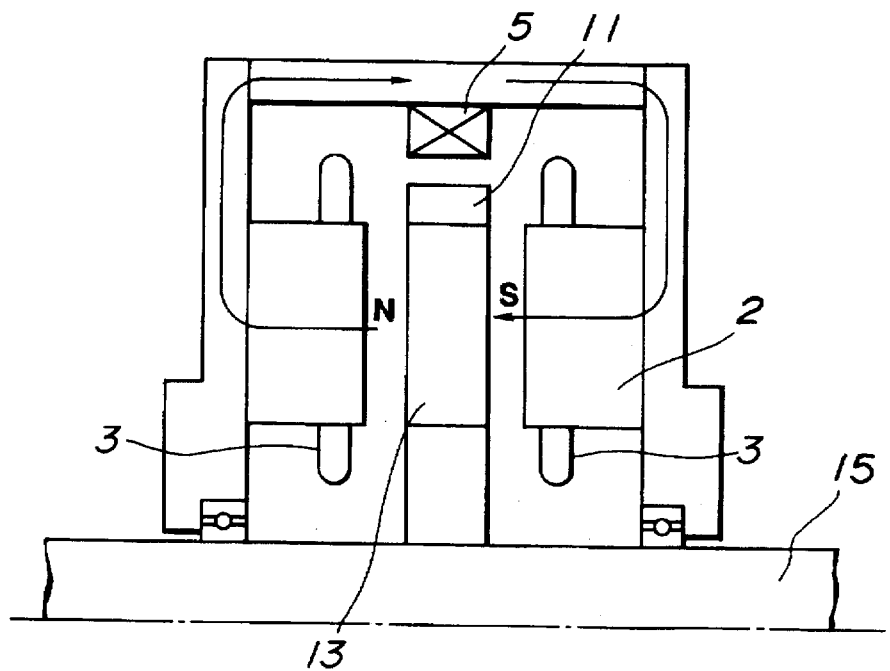
FIG. 33A is a cross-sectional view of a modification of the motor into an axial gap type.
FIG. 33B is a side view of a rotor of FIG. 33A.
Figure 33:
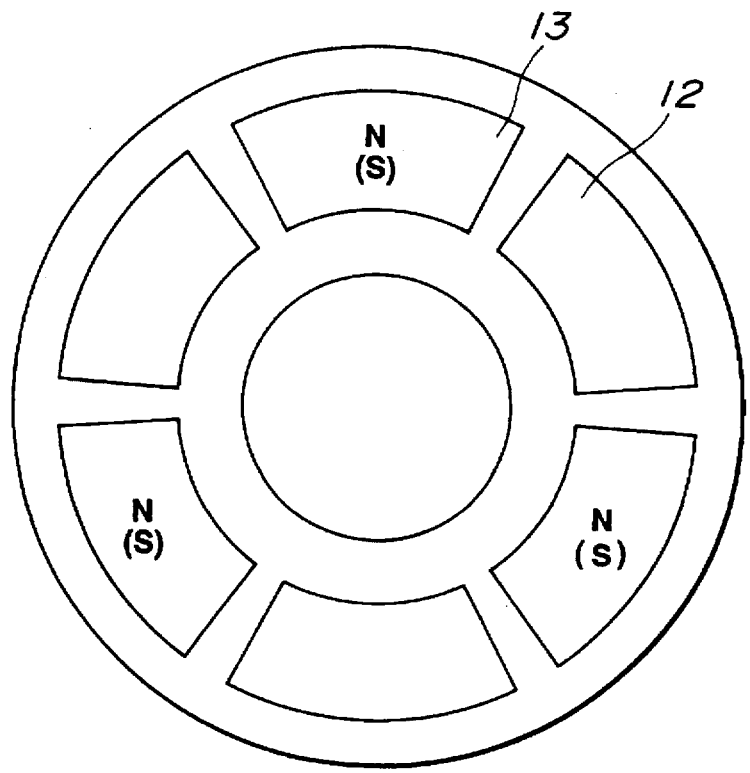
Figure 34:
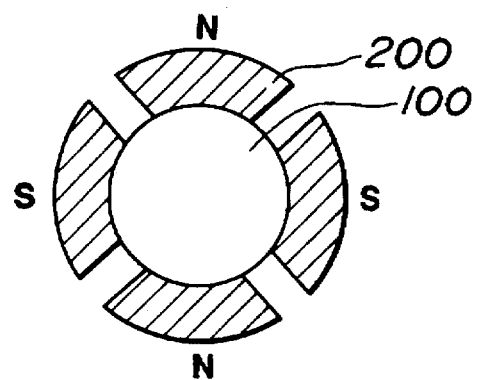
FIGS. 34A and 34B are side views of conventional permanent magnet motors.
Figure 34:
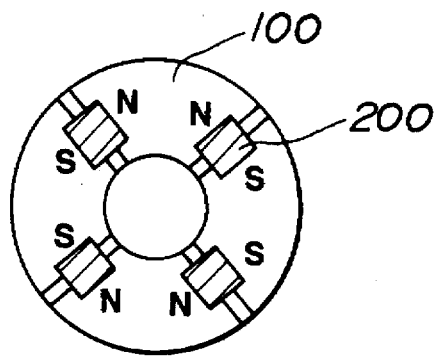
Figure 35:
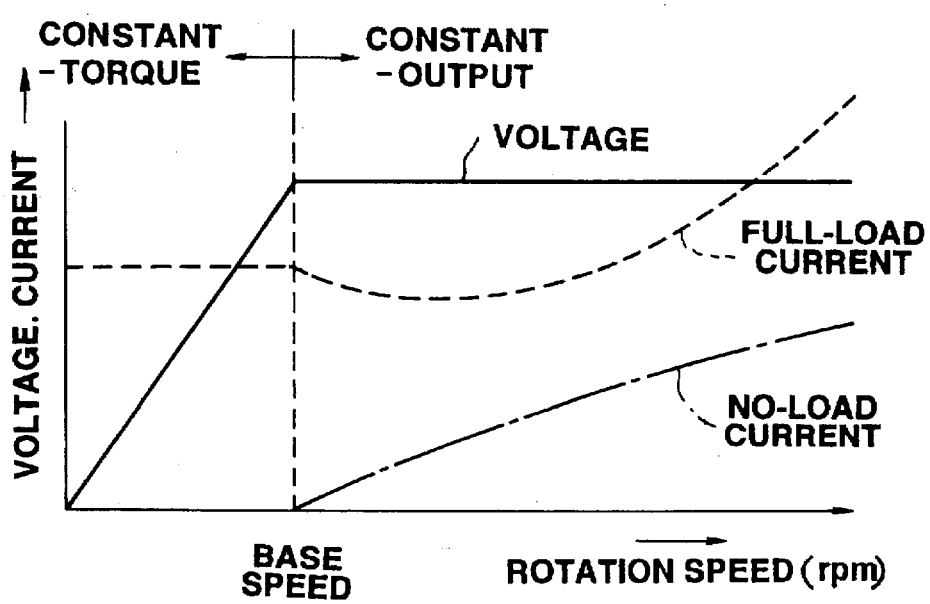
FIG. 35 is a graph for explaining a demagnetization control of the conventional motor.

FIG. 33A and 33B show a modification of an axial-gap type motor in which the permanent magnet 13 and the core 12 are alternately arranged on a rotation disc 11 which is fixed to the non-magnetic shaft such that the rotation disc 11 is rotated around the shaft. The armatures are disposed so as to sandwich the rotation disc 11.

What is claimed is:

1. A hybrid excitation type permanent magnet synchronous motor comprising:

an armature;

a rotor core disposed to be rotated relative to said armature;

a plurality of permanent magnets installed on said rotor core, said permanent magnets generating magnetic flux which passes through said armature through a gap between said rotor core and said armature;

a plurality of salient pole portions integral with said rotor core and not covered by said permanent magnets, said salient pole portions being arranged opposite to said armature through a gap such that the magnetic flux generated by said permanent magnets is effected by the magnetic flux passing through said salient pole portions;

direct current excitation coils to generate the magnetic flux passing through said salient pole portions;

wherein first and second units are formed respectively by alternately arranging said permanent magnets and said salient pole portions along the circumferential direction of the rotor core at equal intervals, the first and second units being arranged in tandem in the axial direction of said rotor core and arranged such that a permanent magnet of the first unit is in-tandem aligned with a salient pole portion of said second unit, the polarity of said permanent magnets of the first unit being the same with respect to each other and being different from the polarity of said permanent magnets of the second unit; and a frame to which said armature is installed corresponding to a permanent magnet and a salient pole portion, said direct current excitation coils being installed on a pair of brackets which are connected to the frame, said pair of brackets supporting said rotor core.

2. A hybrid excitation type permanent magnet synchronous motor comprising:

an armature;

a rotor core disposed to be rotated relative to said armature, a plurality of permanent magnets installed on said rotor core, said permanent magnets generating magnetic flux which passes through said armature through a gap between said rotor core and said armature;

a plurality of salient pole portions integral with said rotor core and not covered by said permanent magnets, said salient pole portions being arranged opposite to said armature through a gap such that the magnetic flux generated by said permanent magnets is effected by the magnetic flux passing through said salient pole portions;

a direct current excitation coil to generate the magnetic flux passing through said salient pole portions;

wherein first and second units are formed respectively by alternately arranging said permanent magnets and said salient pole portions along the circumferential direction of the rotor core at equal intervals, the first and second units being arranged in tandem in the axial direction of said rotor core and arranged such that a permanent magnet of the first unit is in-tandem aligned with a salient pole portion of said second unit, the polarity of said permanent magnets of the first unit being the same with respect to each other and being different from the polarity of said permanent magnets of the second unit; and a pair of armature cores, in said armature which are tandem arranged in the axial direction and at positions corresponding to a permanent magnet and a salient pole portion in the axial direction while being magnetically connected to each other through a yoke, said direct current excitation coil being formed in a ring-shape and being disposed between said armature cores;

wherein a plurality of diagonal slots are formed in each of said armature cores, the diagonal slots of one of said armature cores being arranged so as to be on lines which are the same as lines of the diagonal slots of the other armature core.

3. A hybrid excitation type permanent magnet synchronous motor comprising:

an armature;

a rotor core disposed to be rotated relative to said armatures;

a plurality of permanent magnets installed on said rotor core, said permanent magnets generating magnetic flux which passes through said armature through a gap between said rotor core and said armature;

a plurality of salient pole portions integral with said rotor core and not covered by said permanent magnets, said salient pole portions being arranged opposite to said armature through a gap such that the magnetic flux generated by said permanent magnets is effected by the magnetic flux passing through said salient pole portions;

a direct current excitation coil to generate the magnetic flux passing through said salient pole portions;

wherein first and second units are formed respectively by alternately arranging said permanent magnets and said salient pole portions along the circumferential direction of the rotor core at equal intervals, the first and second units being arranged in tandem in the axial direction of said rotor core and arranged such that a permanent magnet of the first unit is in-tandem aliened with a salient pole portion of said second unit, the polarity of said permanent magnets of the first unit being the same with respect to each other and being different from the polarity of said permanent magnets of the second unit; and a pair of armature cores, in said armature, which are tandem arranged in the axial direction and at positions corresponding to a permanent magnet and a salient pole portion in the axial direction while being magnetically connected to each other through a yoke, said direct current excitation coil being formed in a ring-shape and being disposed between said armature cores;

wherein a plurality of slots along the axial direction are formed in each of said armature cores, the slots of one of said armature cores being offset by ½ slot pitch relative to the slots of the other armature core.

4. A hybrid excitation type permanent magnet synchronous motor comprising:

an armature;

a rotor core disposed to be rotated relative to said armature;

a plurality of permanent magnets installed in said rotor core, said permanent magnets generating magnetic flux which passes through said armature through a gap between said rotor core and said armature;

a plurality of salient pole portions integral with said rotor core and not covered by said permanent magnets, said salient pole portions being arranged opposite to said armature through a gas such that the magnetic flux generated by said permanent magnets is effected by the magnetic flux passing through said salient pole portions; and a direct current excitation coil to generate the magnetic flux passing through said salient pole portions;

wherein first and second units are formed respectively by alternately arranging said permanent magnets and said salient pole portions along the circumferential direction of the rotor core at equal intervals, the first and second units being arranged in tandem in the axial direction of said rotor core and arranged such that a permanent magnet of the first unit is in-tandem aliened with a salient pole portion of said second unit, the polarity of said permanent magnets of the first unit being the same with respect to each other and being different from the Polarity of said permanent magnets of the second unit; wherein said permanent magnets are embedded in said rotor core, a plurality of non-magnetic plates being tandem installed on said rotor core along the axial direction, a damper coil being installed on said rotor core and the plates.

5. A hybrid excitation type permanent magnet synchronous motor comprising:

an armature;

a rotor core disposed to be rotated relative to said armature;

a plurality of permanent magnets installed on said rotor core, said permanent magnets generating magnetic flux which passes through said armature through a gap between said rotor core and said armature;

a plurality of salient pole portions integral with said rotor core and not covered by said permanent magnets, said salient pole portions being arranged opposite to said armature through a man such that the magnetic flux generated be said permanent magnets is effected by the magnetic flux passing through said salient pole portions; and a direct current excitation coil to generate the magnetic flux passing through said salient pole portions;

wherein first and second units are formed respectively by alternately arranging said permanent magnets and said salient pole portions alone the circumferential direction of the rotor core at equal intervals the first and second units being arranged in tandem in the axial direction of said rotor core and arranged such that a permanent magnet of the first unit is in-tandem aligned with a salient pole portion of said second unit, the polarity of said permanent magnets of the first unit being the same with respect to each other and being different from the polarity of said permanent magnets of the second unit;

wherein a slit is formed at each of a center portion of said rotor core corresponding to a permanent magnet and a center portion of a salient pole portion so as to be along the axial direction.

6. A hybrid excitation type permanent magnet synchronous motor comprising:

an armature;

a rotor core disposed to be rotated relative to said armature;

a plurality of permanent magnets installed on said rotor core, said permanent magnets generating magnetic flux which passes through said armature through a gap between said rotor core and said armature;

a plurality of salient pole portions integral with said rotor core and not covered by said permanent magnets, said salient pole portion being arranged opposite to said armature through a gap such that the magnetic flux generated by said permanent magnets is effected by the magnetic flux passing through said salient pole portions; and a direct current excitation coil to generate the magnetic flux passing through said salient pole portions;

wherein said rotor core is of a tandem type which comprises a first rotor core section and a second rotor core section, said permanent magnets being installed on the first and second rotor core sections, a permanent magnet being installed on and between the first and second rotor core sections so that a surface of said permanent magnet in contact with said rotor core has the same polarity as the contacted rotor core.

7. A hybrid excitation type permanent magnet synchronous motor comprising:

an armature;

a rotor core disposed to be rotated relative to said armature;

a plurality of permanent magnets installed on said rotor core, said permanent magnets generating magnetic flux which passes through said armature through a gap between said rotor core and said armature;

a plurality of salient pole portions integral with said rotor core and not covered by said permanent magnets, said salient pole portions being arranged opposite to said armature through a gap such that the magnetic flux generated by said permanent magnets is effected by the magnetic flux passing through said salient pole portions; and a direct current excitation coil to generate the magnetic flux passing through said salient pole portions;

wherein said rotor core is a rotation disc to which a permanent magnet and magnetic member are alternately arranged along the circumferential direction, said armature being installed at both sides of the rotation disc.

* * * * *